United States Patent
Baba et al.

(10) Patent No.: US 8,001,554 B2
(45) Date of Patent: Aug. 16, 2011

(54) COMPOUND INFORMATION PLATFORM AND MANAGING METHOD FOR THE SAME

(75) Inventors: Takashige Baba, Kodaira (JP); Yoshiko Yasuda, Tokorozawa (JP); Jun Okitsu, Kodaira (JP); Toshiaki Tarui, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1259 days.

(21) Appl. No.: 11/649,760

(22) Filed: Jan. 5, 2007

(65) Prior Publication Data

US 2007/0168597 A1   Jul. 19, 2007

(30) Foreign Application Priority Data

Jan. 19, 2006  (JP) .................................. 2006-010608

(51) Int. Cl.
*G06F 9/44* (2006.01)
*G06F 15/177* (2006.01)

(52) U.S. Cl. .......................................... 719/328; 713/1

(58) Field of Classification Search ........................ None
See application file for complete search history.

(56) References Cited

U.S. PATENT DOCUMENTS

| 7,464,257 | B2 * | 12/2008 | Shih et al. ........................... | 713/1 |
| 2002/0008961 | A1 | 1/2002 | Amaike et al. | |
| 2002/0191241 | A1 * | 12/2002 | Emery et al. .................. | 359/109 |
| 2003/0167375 | A1 | 9/2003 | Morishita et al. | |
| 2004/0172470 | A1 | 9/2004 | Shiina | |
| 2005/0108444 | A1 * | 5/2005 | Flauaus et al. .................. | 710/15 |

FOREIGN PATENT DOCUMENTS

| JP | 2002-32153 | 7/2000 |
| JP | 2003-50749 | 8/2001 |
| JP | 2004-215116 | 1/2003 |

OTHER PUBLICATIONS

"Advanced Switching Technology", Tech Brief, Advanced Switching Interconnect SIG Administration, 2 pages.

* cited by examiner

*Primary Examiner* — H. Sough
*Assistant Examiner* — Abdou K Seye
(74) *Attorney, Agent, or Firm* — Hitachi America, Ltd.

(57) ABSTRACT

Module combination candidates which compose an information platform, to reduce human error when a platform is composed, and to permit automatic configuration changes. There is therefore provided a compound information platform comprising information platforms combining one or more universal processing modules and dedicated processing modules, wherein a management module has a means which computes processing module combination candidates when newly composing the information platform, computes the sum total value of the maximum guaranteed communication bandwidth of an IO protocol interface for each physical interconnection PL using an interface setting management information, adding an additional maximum guaranteed communication bandwidth due to a processing module combination candidate, and determining whether this is a possible module combination candidate by comparing the addition result with the maximum permitted communication bandwidth of each physical interconnection.

12 Claims, 24 Drawing Sheets

FIG. 3

| MODULE K301 | TYPE K302 | NO. OF ADAPTERS K303 | TYPE OF PLATFORM THAT CAN BE ASSEMBLED K304 | PLATFORM IDENTIFIER K305 |
|---|---|---|---|---|
| G1 | UNIVERSAL PROCESSING MODULE | 1 | SA,SB,RB-C,NA-C,NB-C | RB1 |
| G2 | UNIVERSAL PROCESSING MODULE | 1 | SA,SB,RB-C,NA-C,NB-C | NOT YET ASSIGNED |
| G3 | UNIVERSAL PROCESSING MODULE | 1 | SA,SB,RB-C,NA-C,NB-C | SA1 |
| G4 | UNIVERSAL PROCESSING MODULE | 1 | SA,SB,RB-C,NA-C,NB-C | NOT YET ASSIGNED |
| G5 | UNIVERSAL PROCESSING MODULE | 1 | SA,SB,RB-C,NA-C,NB-C | RB2 |
| E1 | DEDICATED PROCESSING MODULE | 1 | RA,RB-D | RB1 |
| E2 | DEDICATED PROCESSING MODULE | 1 | NA-L,NB-L | NA1 |
| E3 | DEDICATED PROCESSING MODULE | 1 | NA-L,NB-L | NA1 |
| E4 | DEDICATED PROCESSING MODULE | 1 | RA,RB-D | NOT YET ASSIGNED |
| E5 | DEDICATED PROCESSING MODULE | 1 | RA,RB-D | RB2 |
| ... | ... | ... | ... | ... |

| PLATFORM TYPE (K401) | MEANING (K402) | PLATFORM ELEMENT (K403) | MEANING (K404) |
|---|---|---|---|
| SA | SERVER (WITHOUT LPAR) | — | — |
| SB | SERVER (WITH LPAR) | — | — |
| RA | RAID (SINGLE MODULE TYPE) | — | — |
| RB | RAID (PLURAL MODULE TYPE) | RB-C | RAID CONTROLLER |
|  |  | RB-D | RAID DISK |
| NA | SWITCH (L3 TYPE) | NA-L | LINE CARD |
|  |  | NA-C | PROTOCOL PROCESSING CONTROLLER |
| NB | SWITCH (L7 TYPE) | NB-L | LINE CARD |
|  |  | NB-C | PROTOCOL PROCESSING CONTROLLER |
| ... | ... | ... | ... |

| SW (K501) | SW PORT NUMBER (K502) | MODULE (K503) | PHYSICAL INTERCONNECTION IDENTIFIER (K504) | TYPE (K505) | ADAPTER/PORT NUMBER (K506) |
|---|---|---|---|---|---|
| SW1 | 1 | G1 | PL1 | UNIVERSAL PROCESSING MODULE | 1 |
| SW1 | 2 | NOT YET CONNECTED | PL2 | — | — |
| SW1 | 3 | G2 | PL3 | UNIVERSAL PROCESSING MODULE | 1 |
| SW1 | 4 | NOT YET CONNECTED | PL4 | — | — |
| SW1 | 5 | E1 | PL5 | DEDICATED PROCESSING MODULE | 1 |
| SW1 | 6 | E2 | PL6 | DEDICATED PROCESSING MODULE | 1 |
| SW1 | 7 | SW2 | PL7 | I/O SWITCH | 8 |
| SW2 | 1 | G3 | PL8 | UNIVERSAL PROCESSING MODULE | 1 |
| SW2 | 2 | G4 | PL9 | UNIVERSAL PROCESSING MODULE | 1 |
| SW2 | 3 | G5 | PL10 | UNIVERSAL PROCESSING MODULE | 1 |
| SW2 | 4 | E3 | PL11 | DEDICATED PROCESSING MODULE | 1 |
| SW2 | 5 | E4 | PL12 | DEDICATED PROCESSING MODULE | 1 |
| SW2 | 6 | E5 | PL13 | DEDICATED PROCESSING MODULE | 1 |
| SW2 | 7 | M1 | PL14 | MANAGEMENT MODULE | 1 |
| SW2 | 8 | SW1 | PL7 | I/O SWITCH | 7 |
| ... | ... | ... | ... | ... | ... |

| K601 IF IDENTIFIER | K602 PROTOCOL IDENTIFIER | K603 PHYSICAL INTERFACE IDENTIFIER | K604 SET COMMUNICATION BANDWIDTH | K605 USED COMMUNICATION BANDWIDTH |
|---|---|---|---|---|
| IF1 | IFA | PL1 | best effort | 1Gbps |
|  |  | PL5 | best effort | 1Gbps |
| IF2 | IFB | PL1 | 2Gbps | 1.5Gbps |
|  |  | PL7 | 4Gbps | 2Gbps |
|  |  | PL8 | 4Gbps | 3.5Gbps |
|  |  | PL10 | 4Gbps | 2Gbps |
| IF3 | IFC | PL6 | 2Gbps | 2Gbps |
|  |  | PL7 | 2Gbps | 2Gbps |
|  |  | PL11 | 2Gbps | 2Gbps |
| IF4 | IFA | PL10 | 4Gbps | 3Gbps |
|  |  | PL13 | 4Gbps | 3Gbps |
| ... | ... | ... | ... | ... |

FIG. 7

| PHYSICAL INTERFACE IDENTIFIER | LINK ENDPOINT 1 | | LINK ENDPOINT 2 | |
|---|---|---|---|---|
| | MODULE | ADAPTER/PORT | MODULE | ADAPTER/PORT |
| PL1 | G1 | 1 | SW1 | 1 |
| PL3 | G2 | 1 | SW1 | 3 |
| PL8 | G3 | 1 | SW2 | 1 |
| PL9 | G4 | 1 | SW2 | 2 |
| PL10 | G5 | 1 | SW2 | 3 |
| PL5 | E1 | 1 | SW1 | 5 |
| PL6 | E2 | 1 | SW2 | 6 |
| PL11 | E3 | 1 | SW2 | 4 |
| PL12 | E4 | 1 | SW2 | 5 |
| PL13 | E5 | 1 | SW2 | 6 |
| PL7 | SW1 | 7 | SW2 | 8 |
| ... | ... | ... | ... | ... |

| ITEM (K1001) | DATA (K1002) | |
|---|---|---|
| CONFIGURATION CHANGE TYPE | NEW CONFIGURATION | E1001 |
| INFORMATION PLATFORM TYPE | RB | E1002 |
| PLATFORM TEMPLATE NUMBER | 1 | E1003 |
| ADDITIONAL PROCESSING MODULES? | NO | E1004 |
| DELETED PROCESSING MODULES? | NO | E1005 |
| INTER-PLATFORM INTERFACE? | YES | E1006 |
| INTER-PLATFORM INTERFACE SETTING 1 — COMMUNICATION PARTY PLATFORM IDENTIFIER | SA1 | E1007 |
| INTER-PLATFORM INTERFACE SETTING 1 — PROTOCOL TYPE | IFB | |
| INTER-PLATFORM INTERFACE SETTING 1 — SET COMMUNICATION BANDWIDTH | 4Gbps | |

| TEMPLATE K1301 | ITEM K1302 | | DATA K1303 |
|---|---|---|---|
| 1 | PROCESSING MODULE COMPONENTS | RB-C | 1 |
| | | RB-D | 1 |
| | NUMBER OF INTER-PROCESSING MODULE INTERFACES | | 1 |
| | INTER-PROCESSING MODULE INTERFACE SPECIFICATION 1 | CONNECTION PROCESSING MODULE | RB-C1, RB-D1 |
| | | IF PROTOCOL | IFA |
| | | SET COMMUNICATION BANDWIDTH | 4Gbps |
| 2 | PROCESSING MODULE COMPONENTS | RB-C | 1 |
| | | RB-D | 1 |
| | NUMBER OF INTER-PROCESSING MODULE INTERFACES | | 1 |
| | INTER-PROCESSING MODULE INTERFACE SPECIFICATION 1 | CONNECTION PROCESSING MODULE | RB-C1, RB-D1 |
| | | IF PROTOCOL | IFA |
| | | SET COMMUNICATION BANDWIDTH | 2Gbps |
| 3 | PROCESSING MODULE COMPONENTS | RB-C | 1 |
| | | RB-D | 2 |
| | NUMBER OF INTER-PROCESSING MODULE INTERFACES | | 2 |
| | INTER-PROCESSING MODULE INTERFACE SPECIFICATION 1 | CONNECTION PROCESSING MODULE | RB-C1, RB-D1 |
| | | IF PROTOCOL | IFA |
| | | SET COMMUNICATION BANDWIDTH | 4Gbps |
| | INTER-PROCESSING MODULE INTERFACE SPECIFICATION 2 | CONNECTION PROCESSING MODULE | RB-C1, RB-D2 |
| | | IF PROTOCOL | IFA |
| | | SET COMMUNICATION BANDWIDTH | 2Gbps |
| ... | ... | | ... |

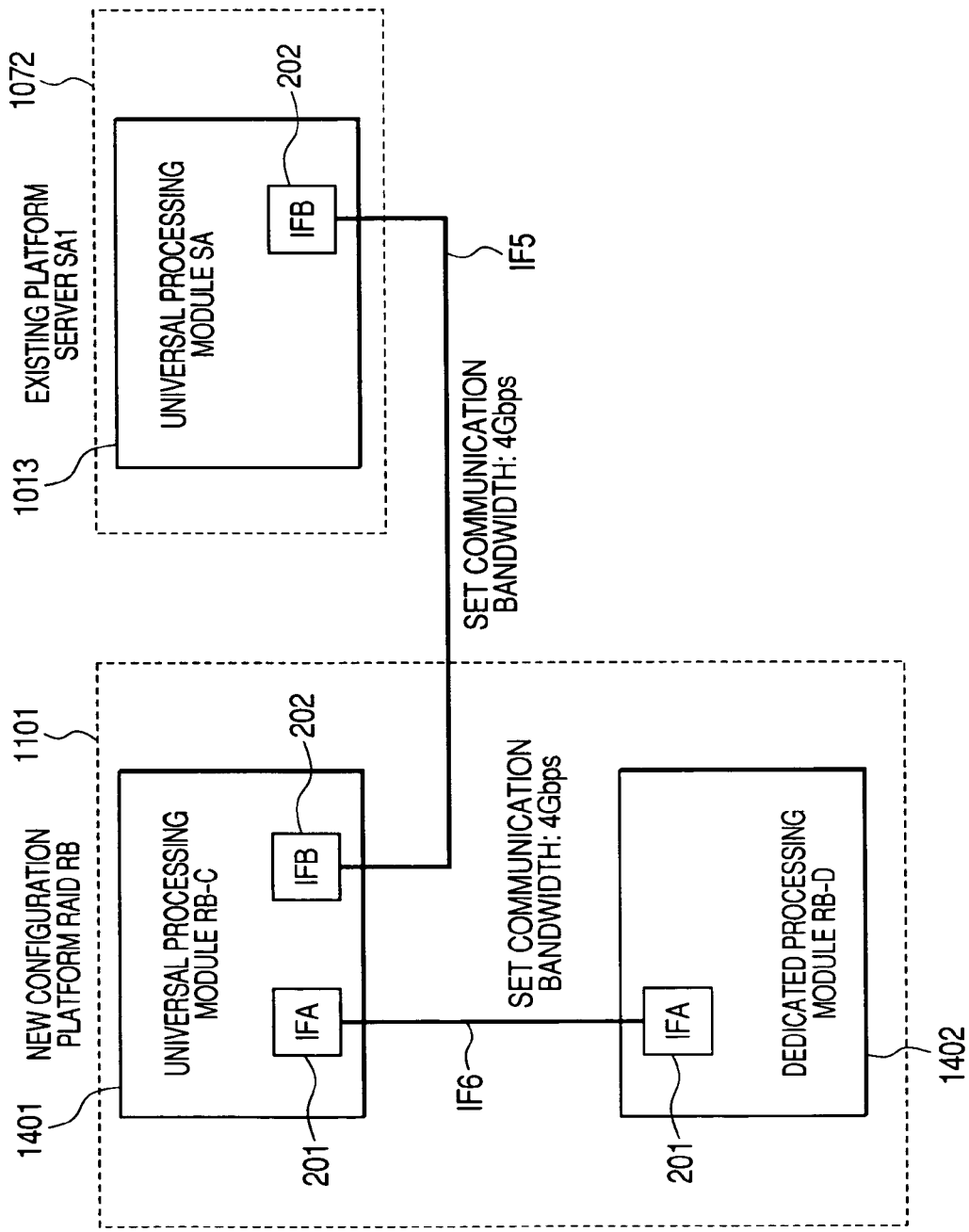

FIG. 15

| CANDIDATE NO. | COMPONENTS | ASSIGNED MODULE |
|---|---|---|
| 1 | RB-C | G2 |
| 1 | RB-D | E4 |
| 2 | RB-C | G4 |
| 2 | RB-D | E4 |

FIG. 16

| CANDIDATE NO. | IF IDENTIFIER | PROTOCOL TYPE | PHYSICAL INTERFACE IDENTIFIER | SET COMMUNICATION BANDWIDTH |
|---|---|---|---|---|
| 1 | IF5 | IFB | PL3 | 4Gbps |
| 1 | IF5 | IFB | PL7 | 4Gbps |
| 1 | IF5 | IFB | PL8 | 4Gbps |
| 1 | IF6 | IFA | PL3 | 4Gbps |
| 1 | IF6 | IFA | PL7 | 4Gbps |
| 1 | IF6 | IFA | PL12 | 4Gbps |
| 2 | IF5 | IFB | PL9 | 4Gbps |
| 2 | IF5 | IFB | PL8 | 4Gbps |
| 2 | IF6 | IFA | PL9 | 4Gbps |
| 2 | IF6 | IFA | PL12 | 4Gbps |

| PHYSICAL INTERFACE IDENTIFIER (K1701) | SET BANDWIDTH (K1702) | USED BANDWIDTH (K1703) | MAXIMUM PERMITTED BANDWIDTH (K1704) |
|---|---|---|---|
| PL1 | 2Gbps | 2.5Gbps | 8Gbps |
| ... | ... | ... | ... |
| PL7 | 6Gbps | 4Gbps | 8Gbps |
| ... | ... | ... | ... |

FIG. 18

| CANDIDATE NO. | PHYSICAL LINK NO. | CURRENT SET BANDWIDTH | CURRENT USED BANDWIDTH (MAX) | MAXIMUM BANDWIDTH | SET BANDWIDTH AFTER CONFIGURATION CHANGE |
|---|---|---|---|---|---|
| 1 | PL1 | 2Gbps | 2Gbps | 8Gbps | 2Gbps |
|  | ⋮ | ⋮ | ⋮ | ⋮ | ⋮ |
|  | PL7 | 6Gbps | 4Gbps | 8Gbps | 14Gbps |
|  | ⋮ | ⋮ | ⋮ | ⋮ | ⋮ |
| 2 | PL1 | 2Gbps | 2Gbps | 8Gbps | 2Gbps |
|  | ⋮ | ⋮ | ⋮ | ⋮ | ⋮ |
|  | PL7 | 6Gbps | 4Gbps | 8Gbps | 6Gbps |
|  | ⋮ | ⋮ | ⋮ | ⋮ | ⋮ |

| CANDIDATE NO. | COMPONENTS | ASSIGNED MODULE |
|---|---|---|
| 1 | RB-C | G4 |
|  | RB-D | E4 |

K1901, K1902, K1903 — FT19

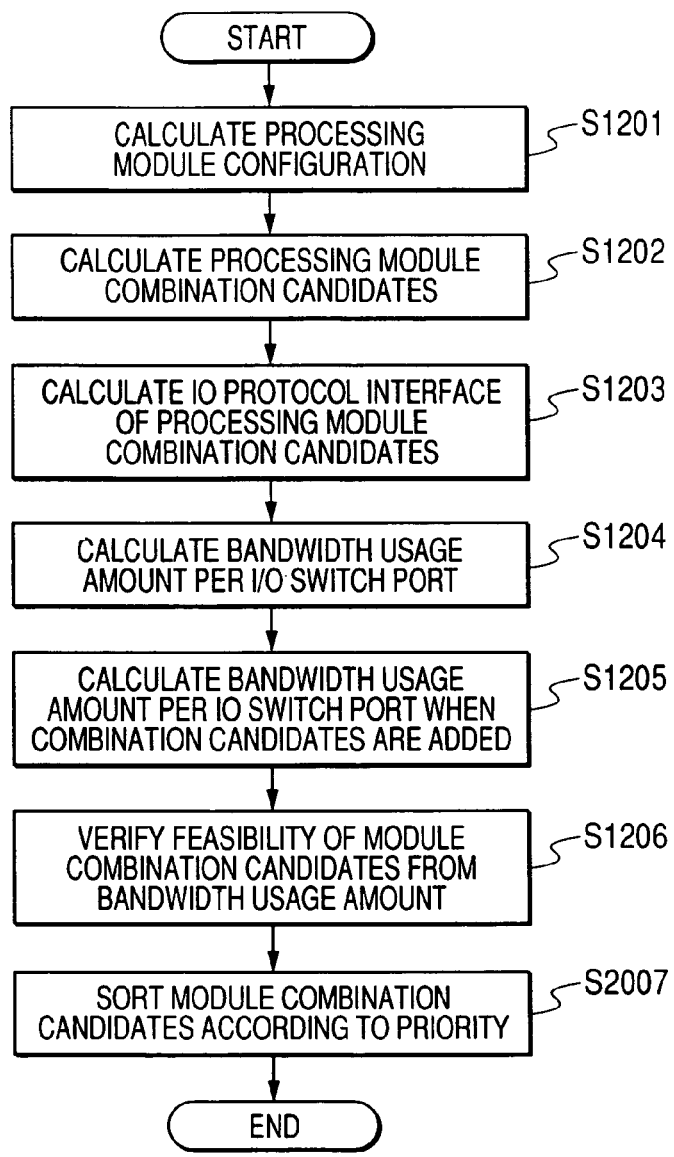

| CANDIDATE NO. (K1901) | COMPONENTS (K1902) | ASSIGNED MODULE (K1903) | PRIORITY RANKING (K2104) | VERIFICATION RESULT (K2405) |
|---|---|---|---|---|
| 1 | RB-C | G4 | 1 | OK |
| | RB-D | E4 | | |

| CANDIDATE NO. K1901 | COMPONENTS K1902 | ASSIGNED MODULE K1903 | OPERATION K2604 | CONNECTION SW K2605 | CONNECTION SW PORT NO. K2606 |
|---|---|---|---|---|---|
| 1 | RB-C | G6 | ADDITION | SW1 | 2 |
|   | RB-D | E4 | NONE | – | – |
| 2 | RB-C | G6 | ADDITION | SW1 | 4 |
|   | RB-D | E4 | NONE | – | – |

| CANDIDATE NO. K1901 | COMPONENTS K1902 | ASSIGNED MODULE K1903 | OPERATION K2604 | CONNECTION SW K2605 | CONNECTION SW PORT NO. K2606 |
|---|---|---|---|---|---|
| 1 | RB-C | G1 | NONE | — | — |
|   | RB-D | E1 | DELETION | SW1 | 5 |
|   | RB-D | E6 | ADDITION | SW1 | 2 |
| 2 | RB-C | G1 | NONE | — | — |
|   | RB-D | E1 | DELETION | SW1 | 5 |
|   | RB-D | E6 | ADDITION | SW1 | 4 |

COMPOUND INFORMATION PLATFORM AND MANAGING METHOD FOR THE SAME

CLAIM OF PRIORITY

The present application claims priority from Japanese application JP 2006-010608 filed on Jan. 19, 2006, the content of which is hereby incorporated by reference into this application.

FIELD OF THE INVENTION

The present invention relates to a management technique for an information platform such as a server, a storage device or a network switching device, and in particular, relates to an effective technique for management of module combinations of a compound information platform comprising plural information platforms wherein the component elements are modularized, and these modules are combined.

BACKGROUND OF THE INVENTION

Examples of information platforms supporting an IT system such as an Internet site are servers which are WEB servers, application servers, etc., storage devices for saving the data in database servers, and network switching devices for connecting servers and storage devices. Each year, the services provided by IT systems are becoming more diversified with more advanced features, an increasing number of information platforms and increasing system complexity. In order to cope with this state of affairs, in recent years, plural servers are now being mounted in one cabinet, and blade servers, which are space-saving and reduce the complexity of power supplies and network cabling, are coming into use. In a blade server, the server is high-density, since the parts of the server such as the CPU, memory and HDD are housed in a thin case known as a blade, plural blades being housed in a case called an enclosure. This type of blade server is disclosed in JP-A No. 32153/2002. On the other hand, in storage devices and network switching devices, the component elements of the device are modularized in order to ensure scalability of efficiency, and are connected with the enclosure only to the extent required to maintain performance. For example, in a storage device, a RAID controller and an HDD disk unit are modularized, and the RAID controller is duplicated to provide scalability of storage capacity. In a network switching device, an external I/F function part known as a line card is modularized to provide scalability of throughput capacity of the switch. Thus, in current information platforms, the component elements of the platform are modularized for each platform. A storage device of this type is disclosed in JP-A No. 50749/2003, and a network switching device of similar type is disclosed in JP-A No. 215116/2004.

SUMMARY OF THE INVENTION

Due to the above modular construction, space-saving and decreased system complexity can be achieved for each platform. However, due to recent globalization, the business environment is rapidly changing, and the IT systems that support the environment are also being required to undergo rapid transformations, or to be used more effectively. In order to cater to such a demand, it is important not only to achieve modularization for each platform, but also to ensure that those modules which can be made compatible across different platforms, are made compatible. This is because, by making modules compatible, the modules can be shared between platforms, and when the platforms are modified, more flexible configuration changes can be made beyond the frame limitations of each platform, thus making communication cables between platforms unnecessary and permitting rapid modifications. When plural servers, storage devices or network switching devices are housed in one enclosure and the modules are compatible between devices, these devices which constitute an "information platform" are then known as a compound information platform.

However, the Inventors discovered that the management of the modular configuration in the aforesaid type of compound information platform has the following problems. In a compound information platform, the various component information platforms comprise universal processing modules which perform universal tasks which can be shared across platforms, and dedicated processing modules which perform the specific tasks of each information platform. These processing modules (hereafter, referred to as universal processing modules and dedicated processing modules) are interconnected by IO switches, communication between the modules being performed by interfaces (e.g., Ethernet (registered trademark), fiber channels, etc.), or so-called IO protocol interfaces, of the various types of protocols required for the information platforms. In general, since it is costly to provide switches having equivalent ports (an example of a switch having equivalent ports is the crossbar switch used in supercomputers), the IO switches in compound information platforms are switches having asymmetrical ports, which are more economical.

When these asymmetrical IO switches are used, to provide an IO protocol interface which guarantees communications bandwidth on the IO switch so as to construct a new information platform, it must be determined, knowing the communications bandwidths of the protocol interfaces already set for the other existing information platforms, whether or not it is possible to construct the new information communications platform by searching for an unassigned communications band. To determine this, it is required to set not only the interfaces between information platforms but also the interfaces inside the information platform, and moreover, an IO protocol interface has various types of interface for each type of protocol. Due to these factors, manual setting is extremely difficult, and there is a high probability of human error. Also, to perform rapid modifications of an IT system, configuration changes have to be made automatically by management servers which control the entire system, but in this compound information platform, since it must first be determined whether or not it is possible to construct the aforesaid information platform, automatic configuration changes cannot be made by the management servers.

It is therefore an object of the present invention, when re-composing the aforesaid compound information platform, to determine whether or not a management module installed in the compound information platform can form part of the information platform, and to provide information concerning processing module combination candidates. In this way, human error when re-composing the compound information platform can be reduced, and the configuration of the information platform can be automatically modified by a management server.

From a certain viewpoint, the novel features of the invention can be summarized as follows.

The invention is a compound information platform, which may consist of one or more different types of information platform, comprising one or more universal processing modules having a universal processing function, one or more dedicated processing modules having a dedicated processing function specific to the module, a management module which manages the universal processing module and dedicated processing module, and one or more IO switches which connect these modules together and perform communication data switching, wherein these modules have one or more IO adapters for communication using the IO switches, the platform being constructed by combining the universal processing modules and the dedicated processing modules, wherein the management module comprises an interface monitoring means having configuration management information including information regarding the connection between the universal processing modules, the dedicated processing modules and the IO switches, module management information including the type of platforms which can be composed by the universal processing modules and the dedicated processing modules, and the type ID of the information platform which is currently assigned, and interface setting management information comprising physical interconnections showing the path of each communications interface between the IO adapters and modules set using the IO switches in the information platform, the maximum guaranteed communications bandwidth setting and the used communications bandwidth which was actually monitored, and the IO switch monitors the communications bandwidth used by the physical interconnection of each inter-module communications interface, and notifies the monitored communications bandwidth used to the management module, wherein, the management module further comprises candidate calculation means which, when it is desired to compose a new information platform, computes module combination candidates derived from the plural universal processing management modules or dedicated processing modules, specifies the physical interconnections of the communications interfaces between the modules constituting each module combination candidate, adds the maximum guaranteed communications bandwidth of the communications interfaces between the modules constituting the module combinations for the specified physical interconnections to the total values of the maximum guaranteed communications bandwidths of the inter-module communications interfaces for each physical interconnection computed from the interface setting management information, selects module combination candidates by comparing the addition result with the maximum permitted communication bandwidth of the physical interconnections, and thus deduces the module combination candidates which can form part of the compound information platform.

Describing the selection of module combination candidates in more detail, the sum total values of the maximum guaranteed communication bandwidth for each physical interconnection in the present configuration before adopting a module combination candidate, are computed from the aforesaid interface setting management information, and the sum total values of the maximum guaranteed communication bandwidths for each physical interconnection when the maximum guaranteed communication bandwidths of each physical interconnection are further added to the inter-module communication interface of the module combination candidate concerned, and this module combination candidate is adopted (after configuration change), are calculated. If the sum total values of the maximum guaranteed communication bandwidths after this configuration change satisfy the condition of being less than the maximum permitted communication bandwidth permitted by the specification of each physical interconnection, respectively, it is determined that the module combination candidate concerned is a module combination candidate which can form part of the compound information platform.

Other characteristic features of the invention will become clear from the description of the embodiments and the drawings.

The effects obtained from some of the typical features of the invention disclosed in this application, are as follows.

When composing an information platform, it is determined whether or not a management module installed in a compound information platform can be part of the information platform, and information regarding processing module combination candidates 101, 102 is provided. In this way, human error when the compound information platform is composed, can be reduced. Moreover, when a management server is part of the compound information platform, a management module provides information regarding the processing module combination candidates 101, 102, and thus the platform can be composed automatically by selecting these candidates.

BRIEF DESCRIPTION OF THE DRAWINGS

FIG. 3 is a diagram showing an example of module management information in the management module of the first embodiment;

FIG. 4 is a diagram showing an example of an information platform type which can be assembled in the compound information platform of the first embodiment;

FIG. 5 is a diagram showing an example of composition management information in the management module of the first embodiment;

FIG. 6 is a diagram showing an example of interface setting management information in the management module of the first embodiment;

FIG. 7 is a diagram showing an example of information about a connection endpoint for each physical interconnection in the management module of the first embodiment;

FIG. 10 is a diagram showing an example of an information platform composition request from the management server to the management module of the first embodiment;

FIG. 13 is a diagram showing an example of platform configuration specification information in the management module of the first embodiment;

FIG. 14 is a diagram showing an example of a platform module composition according to an information platform configuration request from the management server to the management module of the first embodiment;

FIG. 15 is a diagram showing an example of information about module combination candidates used with the information platform configuration candidate calculation method of the first embodiment;

FIG. 16 is a diagram showing an example of configuration information about an IO protocol interface of a module combination candidate used in the information platform configuration candidate calculation method of the first embodiment;

FIG. 17 is a diagram showing an example of setting information about a physical interconnection used with the information platform configuration candidate calculation method of the first embodiment;

FIG. 18 is a diagram showing an example of setting information about a physical interconnection to which a module combination candidate used with the information platform configuration candidate calculation method of the first embodiment is added;

FIG. 19 is a diagram showing an example of information about information platform configuration candidates notified to the management server from the management module of the first embodiment;

FIG. 20 is a flow chart showing an information platform configuration candidate calculation method according to a second embodiment of the invention;

FIG. 21 is a diagram showing an example of information about information platform configuration candidates notified to the management server from the management module of the second embodiment;

FIG. 26 is a diagram showing an example of information about information platform configuration candidates notified to the management server from the management module of the fourth embodiment;

FIG. 28 is a diagram showing an example of information about information platform configuration candidates notified to the management server from the management module of the fifth embodiment.

DETAILED DESCRIPTION OF THE PREFERRED EMBODIMENTS

Hereafter, one embodiment of the invention will be described in detail based on the drawings. To describe the embodiment, the same symbols are in principle assigned to the same members in all the diagrams, and their description is not repeated.

First Embodiment

Figure 1:
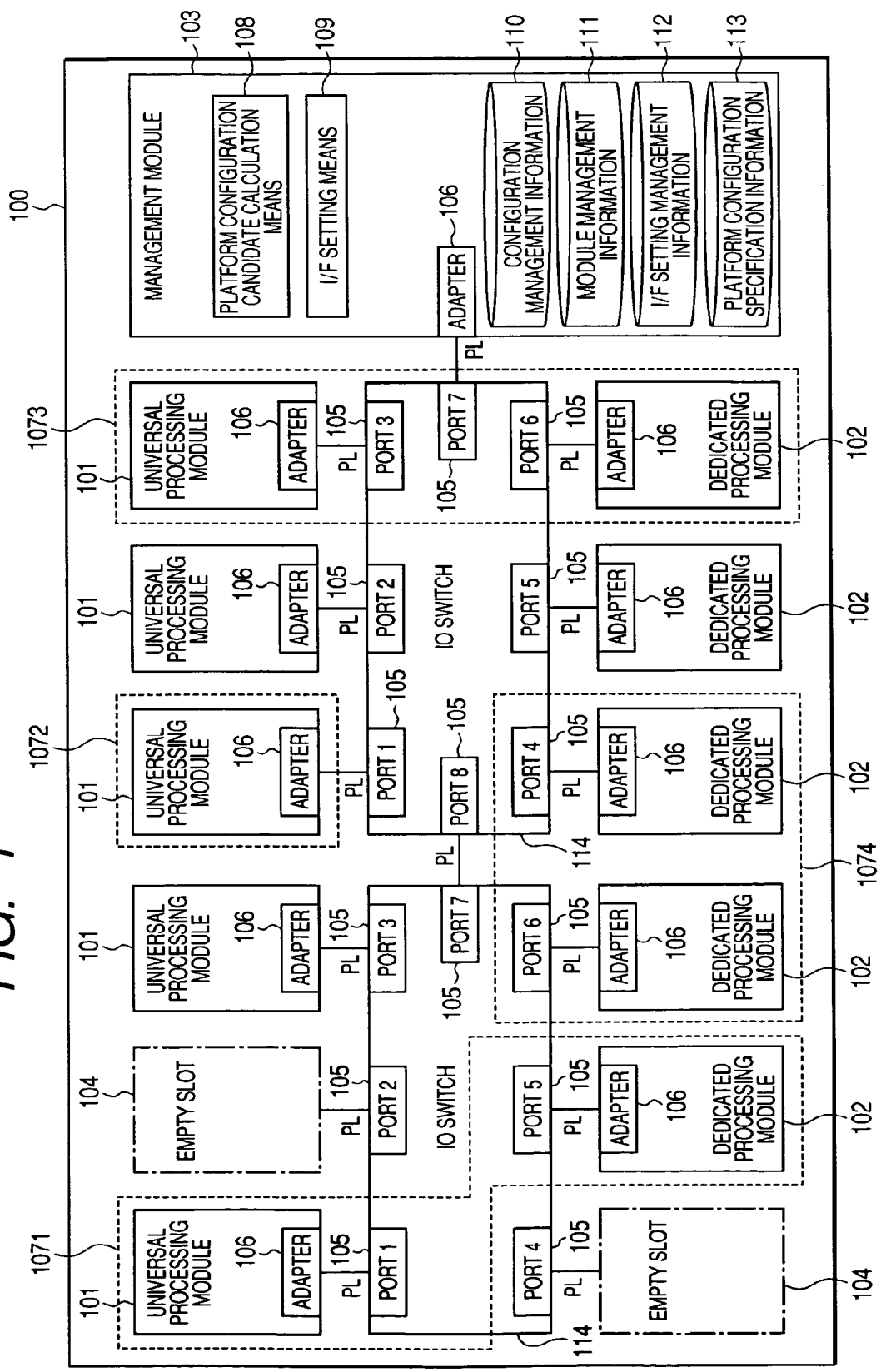
FIG. 1 is a block diagram of the compound information platform according to a first embodiment of the invention.

The configuration of the compound information platform of the first embodiment of the invention will first be described referring to FIG. 1. As shown in FIG. 1, the compound information platform 100 of this embodiment comprises one or more universal processing modules 101, one or more dedicated processing modules 102, one or more IO switches 114 having two or more ports 105, and a management module 103. FIG. 1 shows only one of the management modules 103, but two or more may be provided to improve reliability. These universal processing modules 101 and dedicated processing modules 102 can be installed in any of empty slots 104 of the enclosure of the compound information platform 100. The universal processing module 101 comprises a general-purpose processor and a memory, and is used to perform general-purpose computation in a server, storage device or network switching device. For example, it is used as the computation part of a server, the RAID controller part of a storage device or the data-processing part of a high layer of a network switching device. The dedicated processing module 102 is used to perform dedicated processing in a server, storage device or network switching device. Therefore, the modular internal configuration is different for each dedicated function. For example, it is used for the extended PCI (Peripheral Components Interconnect) card slot part of a server, the HDD disk part of a storage device or the line card part of a network switching device. IO adapters 106 are installed in the universal processing module 101, the dedicated processing module 102 and the management module 103, and are connected to the ports 105 of the IO switch 114 by a physical interconnection PL. When there are two or more IO switches, the ports 105 of the IO switch 114 are connected by the physical interconnection PL. For each module, modules can communicate with other modules via the IO switch 114 using individual IO protocol interfaces (for example, Ethernet (registered trademark), Fibre Channel, etc.) by the function of the IO adapters 106. A well-known example with the function of such an IO adapter and IO switch is PCI Express Advanced Switch Interconnect ("Advanced Switching Technology, Tech Brief" (ASI-SIG and 2005/3 issue)).

In the compound information platform 100, one or more of the universal processing modules 101 or dedicated processing modules 102 are combined to form one or more information platforms 1071, 1072, 1073, and 1074. In FIG. 1, an example comprising the platform 1072 which consists of one universal processing module as a server, the platforms 1071, 1073 which consist of one or more universal processing modules and one or more dedicated processing modules as a storage device, and the platform 1074 which consists of two dedicated processing modules as a network switching device, is shown. Communication between the modules in these information platforms and communication between the information platforms is performed using the IO protocol interface which uses the aforesaid IO adapters 106 and aforesaid IO switches 114.

Figure 2:
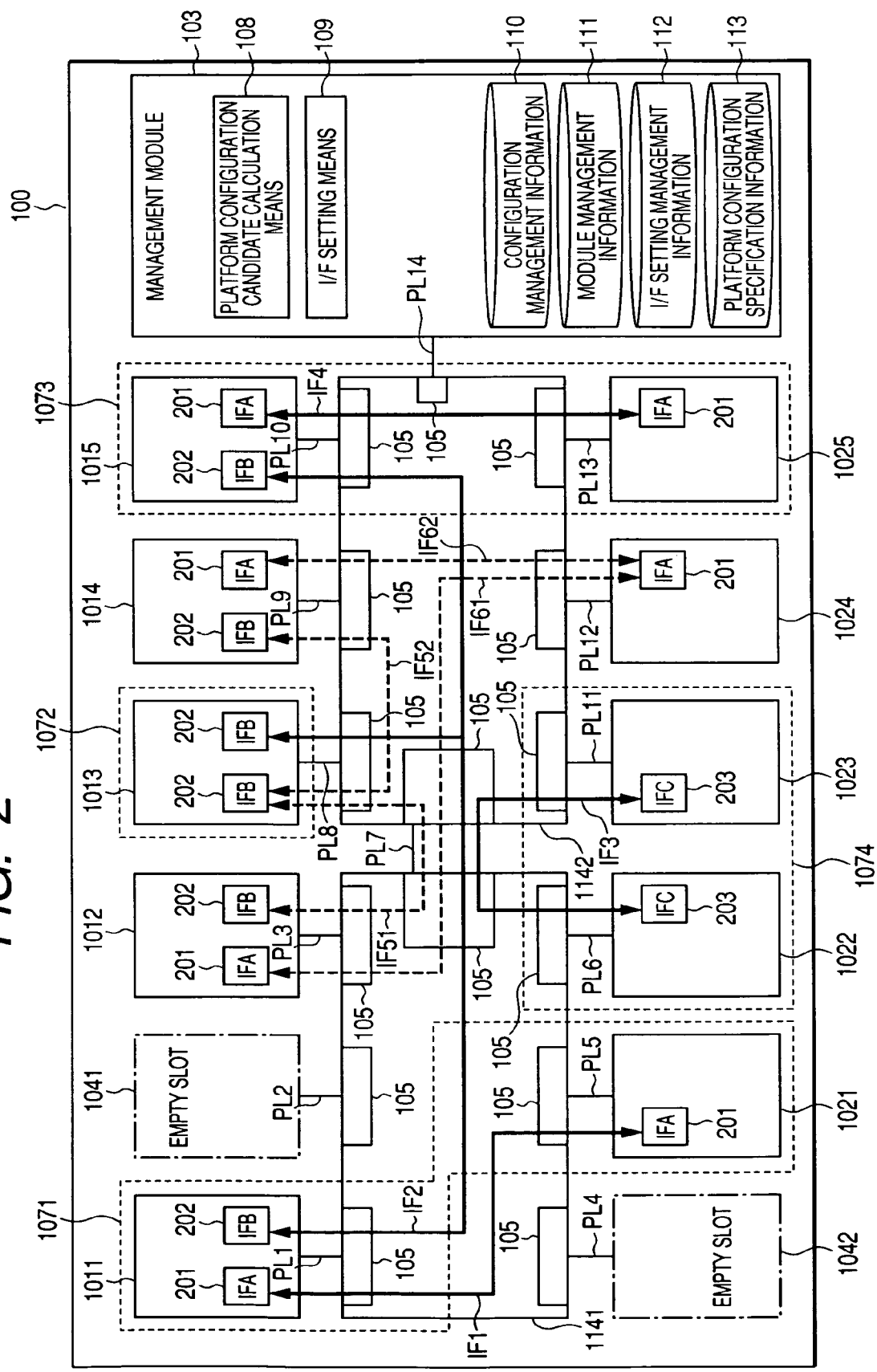
FIG. 2 is a diagram showing an example of the IO protocol interface of the first embodiment.

Next, the IO protocol interface formed by the compound information platform 100 shown in FIG. 1 will be described. FIG. 2 is a diagram showing a typical IO protocol interface of the compound information platform of FIG. 1. The universal processing modules, dedicated processing modules, IO switches, empty slots and physical interconnections shown in FIG. 2 are the same as those in FIG. 1, but in order to clarify the description, symbols are assigned so that each module can be distinguished. Specifically, symbols are assigned to the universal processing modules 1011, 1012, 1013, 1014, 1015, dedicated processing modules 1021, 1022, 1023, 1024, 1025, IO switches 1141, 1142, empty slots 1041, 1042, and physical interconnections PL1, PL2 ... PL14. In FIG. 2, the block of the IO adapter on each module itself is omitted. As shown in FIG. 2, communication between the modules in the information platforms and communication between the information platforms is performed via the adapters 201, 202, 203 of the individual IO protocol interfaces provided by the function of the IO adapter 106 on each module. In FIG. 2, four IO protocol interfaces IF1, IF2, IF3, and IF4 are shown by solid lines. The IO protocol interfaces IF1, IF4 use the protocol type IFA (for example, Fibre Channel) of IO protocol interface in the storage devices 1071, 1072. The IO protocol interface IF1 performs communication in the storage device between the universal processing module 1011 and the dedicated processing module 1021 which form part of the storage device 1071. Similarly, the IO protocol interface IF4 performs communication in the storage device between the universal processing module 1015 and the dedicated processing module 1025 which form part of the storage device 1073. The IO protocol interface IF2 uses the protocol type IFB (for example, Ethernet (registered trademark)) of IO protocol interface between the storage devices 1071, 1073, 1072. The IO protocol interface IF2 performs communication between the universal processing module 1011 which forms part of the storage device 1071, the universal processing module 1013 which forms part of the server 1072, and the universal processing module 1015 which form part of the storage device 1073. The IO protocol interface IF3 uses the protocol type IFB (for example, CSIX used for the internal interface of the network switching device) of IO protocol interface in the network switching device 1074. The IO protocol interface IF3 performs communication in the network switching device between the dedicated processing module 1022 and the dedicated processing module 1023 which form part of the network switching device 1074.

Next, the management module 103 of the compound information platform of the first embodiment will be described. The management module 103 is formed by combining one or more of the universal processing modules 101 or the dedicated processing modules 102 of the compound information platform 100 shown in FIG. 1, and therefore has configuration management information 110, module management information 111, interface (I/F) setting management information 112, and platform configuration specification information 113. This information will be described in detail using FIGS. 3-7.

FIG. 3 is a descriptive diagram showing an example of the module management information in the management module 103. FIG. 4 is a descriptive diagram showing an example of an information platform which can be formed in the compound information platform of FIG. 1. FIG. 5 is a descriptive diagram showing an example of the configuration management information in the management module of the compound information platform of FIG. 1. FIG. 6 is a descriptive diagram showing an example of the interface setting management information in the management module of the compound information platform of FIG. 1. FIG. 7 is a descriptive diagram showing an example of information regarding the connection endpoint of the physical interconnection PL for each physical interconnection in the management module of the compound information platform of FIG. 1.

The module management information 111 contains at least identification information regarding the universal processing modules 101 and the dedicated processing modules 102 in the compound information platform 100, information as to which component elements of the information platform these may become, and information regarding the information platform to which they are currently assigned. Expressing this in tabular form, as shown by Table FT3 of FIG. 3, the module management information 111 may comprise for example an identifier K301 of the processing modules 101, 102 installed in the compound information platform 100, a type K302 of the processing modules 101, 102, a number K303 of the IO adapters 106 installed in the processing modules 101, 102, a type K304 of the information platform which the processing modules 101, 102 can form as component elements, and an identifier K305 of the information platform to which the processing modules 101, 102 are currently assigned. Examples of information platform types shown by the type K304 of information platform, are shown in Table FT4 of FIG. 4. The server may be for example a server SA without a logic division or a server SB with a logic division. The storage device may be for example a RAID device RA having a single module, or a RAID device RB having plural modules. The RAID device RB of the plural module type may comprise a RAID controller RB-C and RAID disk RB-D as component elements. The network switching device may be for example a switching device NA of layer 3 (L3) type or a switching device NB of layer 7 (L7) type. The switching device NA of layer 3 (L3) type may have a line card NA-L which is an IO functional part of an external device, and a protocol processing controller NA-C which performs the protocol processing of L3, as component elements. The switching device NB of layer 7 type may have a line card NB-L which is an IO functional part of an external device, and a protocol processing controller NB-C which performs the protocol processing of L7, as component elements.

Next, the various information in the module management information 111 will be described using FIG. 2 and FIG. 3. As shown in FIG. 3, the universal processing module 1011 shown in FIG. 2 has a modular identifier G1, and one of the IO adapters 106. The types of information platform of which it may form part are the server SA without logic division, the server SB with logic division, the RAID controller RB-C, the protocol processing controller NA-C which performs the protocol processing of L3, and the protocol processing controller NB-C which performs the protocol processing of L7, and the identifier of the information platform to which it is currently assigned is the RAID device RB1 of plural module type. On the other hand, as shown in FIG. 3, the universal processing module 1014 shown in FIG. 2 has a modular identifier G4, and is a universal processing module of identical type to the universal processing module 1011, but since it is not assigned to any type of information platform, an identifier has not yet been determined for the type of information platform to which it is currently assigned. Also, as shown in FIG. 3, the dedicated processing module 1021 shown in FIG. 2 has a modular identifier El and one of the IO adapters 106. The types of the information platform of which it may form part are the RAID device RA and RAID disk RB-D having a single module, and the identifier of the information platform to which it is currently assigned is the RAID device RB1 of plural module type. This module management information shows which component modules of the information platforms are present in the compound information platform 100. As described above, since the identifiers of the information platforms to which the universal processing modules 1011 and dedicated processing modules are currently assigned, are identical, it is seen that this is a component module of the RAID device RB1 of plural module type. Hence, the configuration of the information platform can be managed to figure out that the storage device 1071 of FIG. 2 is the RAID device RB1 of plural module type, the server 1072 is the server SA1 without logic division, the storage device 1073 is the RAID device RB2 of plural module type, and the network switching device 1074 is the switching device NA of L3 type.

The composition management information 110 contains at least information showing the universal processing modules 101 and the dedicated processing modules 102 installed in the compound information platform 100, and the physical connections of the IO switches 114. Expressing this in tabular form, as shown in Table FT5 of FIG. 5, it contains an identifier K501 for identifying the IO switch 114, an identifier K502 of the port 105 of the IO switch 114, an identifier K503 of the module connected to this port 105, an identifier K504 of the physical interconnection PL which connects the module and the IO switch 114, a module type K505, and a number K506 of the IO adapter 106 installed in the module. In the columns for the module identifier K503 and the module type K505, when another IO switch 114 and management module 103 are connected to the IO switch 114 in addition to the universal processing module 101 and the dedicated processing module 102, it has information regarding the module identifier and type of the IO switch 114 and management module 103. Also, in the column of the number K506 of the IO adapter 106, when another IO switch 114 is connected to the IO switch 114, it has information regarding the identification number of the port 105 of the IO switch 114. In FIG. 5, SW1 corresponds to an IO switch 1141 shown in FIG. 2, and SW2 corresponds to an IO switch 1142 shown in FIG. 2.

Next, the details of the composition management information 110 will be described using FIG. 2 and FIG. 5. As shown in FIG. 5, the universal processing module (identifier G1) 1011 shown in FIG. 2 is connected to identification number 1 of the port 105 of the IO switch 1141 of SW1 by the physical interconnection PL1. The identification number 8 of the port 105 of the IO switch 1142 (identifier SW2) shown in FIG. 2 is connected to identification number 7 of the port 105 of the IO switch 1141 of SW1 by the physical interconnection PL7.

The interface (I/F) setting management information 112 comprises at least identification information regarding the IO protocol interface formed by the IO adapter 106 and IO switch 114, path information for the physical interconnection currently assigned to the IO protocol interface, and information regarding the maximum guaranteed communication bandwidth set for the IO protocol interface. Expressing this in tabular form, as shown by Table FT6 in FIG. 6, the interface (I/F) setting management information 112 comprises an identification information K601 for the IO protocol interface formed by the IO adapter 106 and IO switch 114, a protocol type K602 of the IO protocol interface, an identifier K603 of the physical interconnection PL which shows the path of the IO protocol interface, a maximum guaranteed communication bandwidth K604 for each physical interconnection PL set for the IO protocol interface, and an actually used communication bandwidth K605 for each physical interconnection PL monitored by the IO adapters 106 and IO switches 114. For the actually used communication bandwidth, the maximum communication bandwidth of the corresponding IO protocol interface within a fixed time may for example be used. The identifier of the physical interconnection PL is managed using information regarding the connection endpoint of the physical interconnection PL for each physical interconnection shown in Table FT7 of FIG. 7. Specifically, expressing this in tabular form, it has an identifier K701 of the physical interconnection PL, an information K702 regarding an endpoint 1 which is one of the points connected to the physical interconnection PL, and information K703 regarding an endpoint 2 which is the other point connected to the physical interconnection PL. The endpoint information K702, K703 respectively have an identification K7041 for the module or IO switch 114, and an adapter number or port number K7042 in the module or IO switch 114.

Next, the details of the interface setting management information 112 will be described using FIG. 2 and FIG. 6. The IO protocol interface IF1 which performs communication in the storage device between the universal processing module 1011 and the dedicated processing module 1021 forming part of the storage device 1071 shown in FIG. 2, uses the protocol type IFA of IO protocol interface, and the physical interconnections PL assigned are PL1, PL5. The maximum guaranteed communication bandwidth set for the physical interconnection PL1 is a best effort type, and the actually used communication bandwidth is 1 Gbps. The maximum guaranteed communication bandwidth set for physical interconnection PL5 is a best effort type, and the actually used communication bandwidth is 1 Gbps. Here, the best effort type is a communication type without the maximum guaranteed communication bandwidth which makes the utmost effort to reduce data delay and data loss, if possible, but does not permit communication when communication is congested due to other communications. As an example of other information, the IO protocol interface IF2 which performs communication between servers and storage devices among the universal processing module 1011 forming part of the storage device 1071, the universal processing module 1013 forming part of the server 1072, and the universal processing module 1015 forming part of the storage device 1073 in FIG. 2, uses the protocol type IFB of IO protocol interface, and the physical interconnections PL assigned are PL1, PL7, PL8, PL10. When the path of the IO protocol interface spans plural IO switches 114, the physical interconnection PL7 between the IO switch 1141 and IO switch 1142 must be assigned as in this example. The maximum guaranteed communication bandwidth set for the physical interconnection PL1 is 2 Gbps, and the actually used communication bandwidth is 1.5 Gbps. The maximum guaranteed communication bandwidth set for the physical interconnection PL7 is 4 Gbps, and the actually used communication bandwidth is 1.5 Gbps. The maximum guaranteed communication bandwidth set for the physical interconnection PL8 is 4 Gbps, and the actually used communication bandwidth is 3.5 Gbps. The maximum guaranteed communication bandwidth set for the physical interconnection PL1 is 4 Gbps, and the actually used communication bandwidth is 2 Gbps. As in this example, different maximum guaranteed communication bandwidths may be set for each of the physical interconnections PL.

The management module 103 comprises a platform configuration candidate calculation means 108 which manages the configuration of the compound information platform by combining one or more of the universal processing modules 101 or the dedicated processing modules 102 using the aforesaid configuration management information 110, module management information 111, interface setting management information 112 and platform configuration specification information 113, and has an interface setting means 109 which sets the IO protocol interface formed using the IO adapter 106 and IO switch 114.

Next, the management method used when assembling a new configuration or modifying the configuration of the compound information platform 100 according to one aspect of the invention described above, will be described referring to flow charts. First, an overview of the management method will be given, and the management method used when composing an actual information platform will be described using FIG. 8 and FIG. 9.

Figure 8:
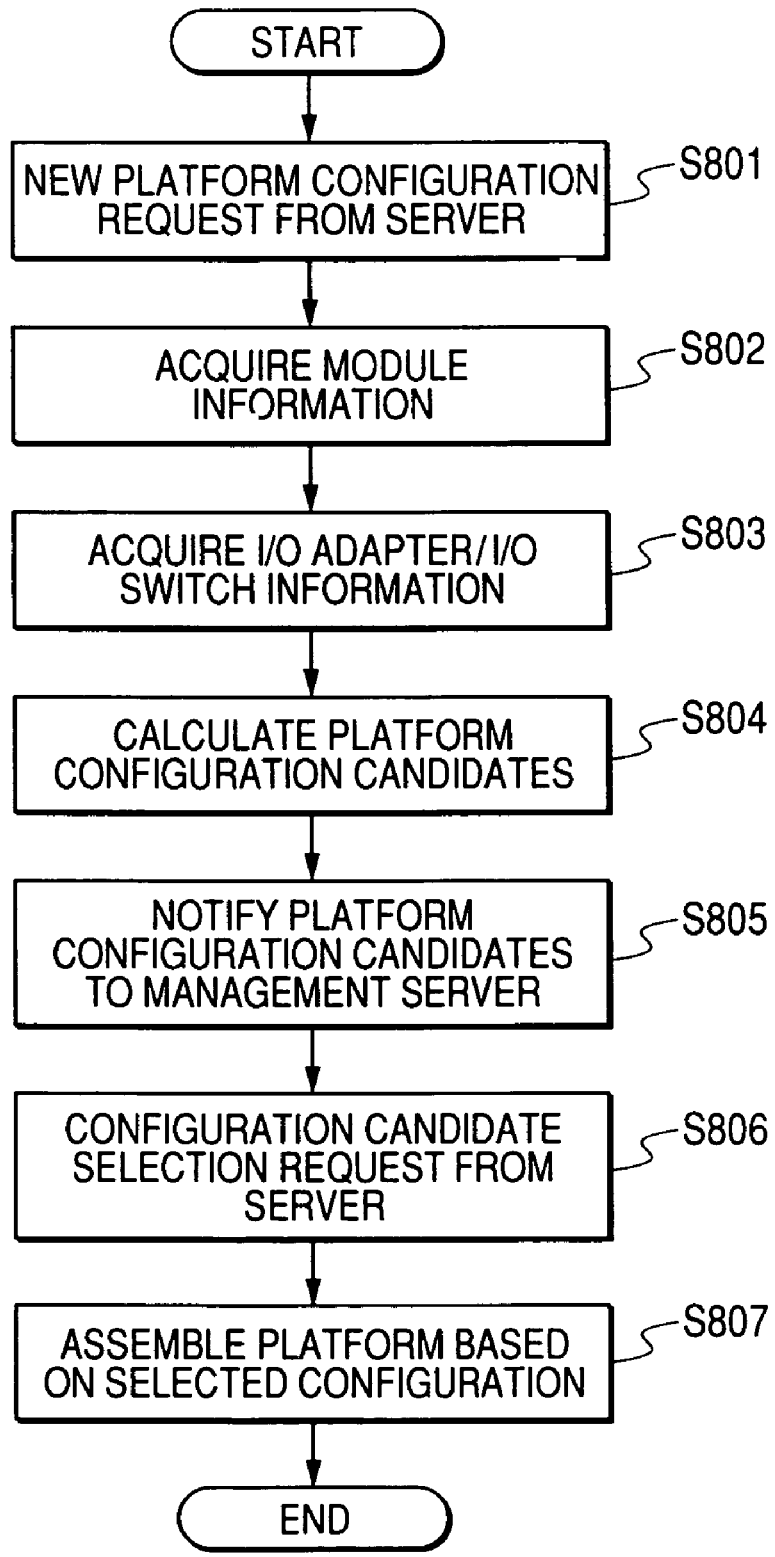
FIG. 8 is a flow chart showing a management method when the information platform of the first embodiment is composed.
Figure 9:
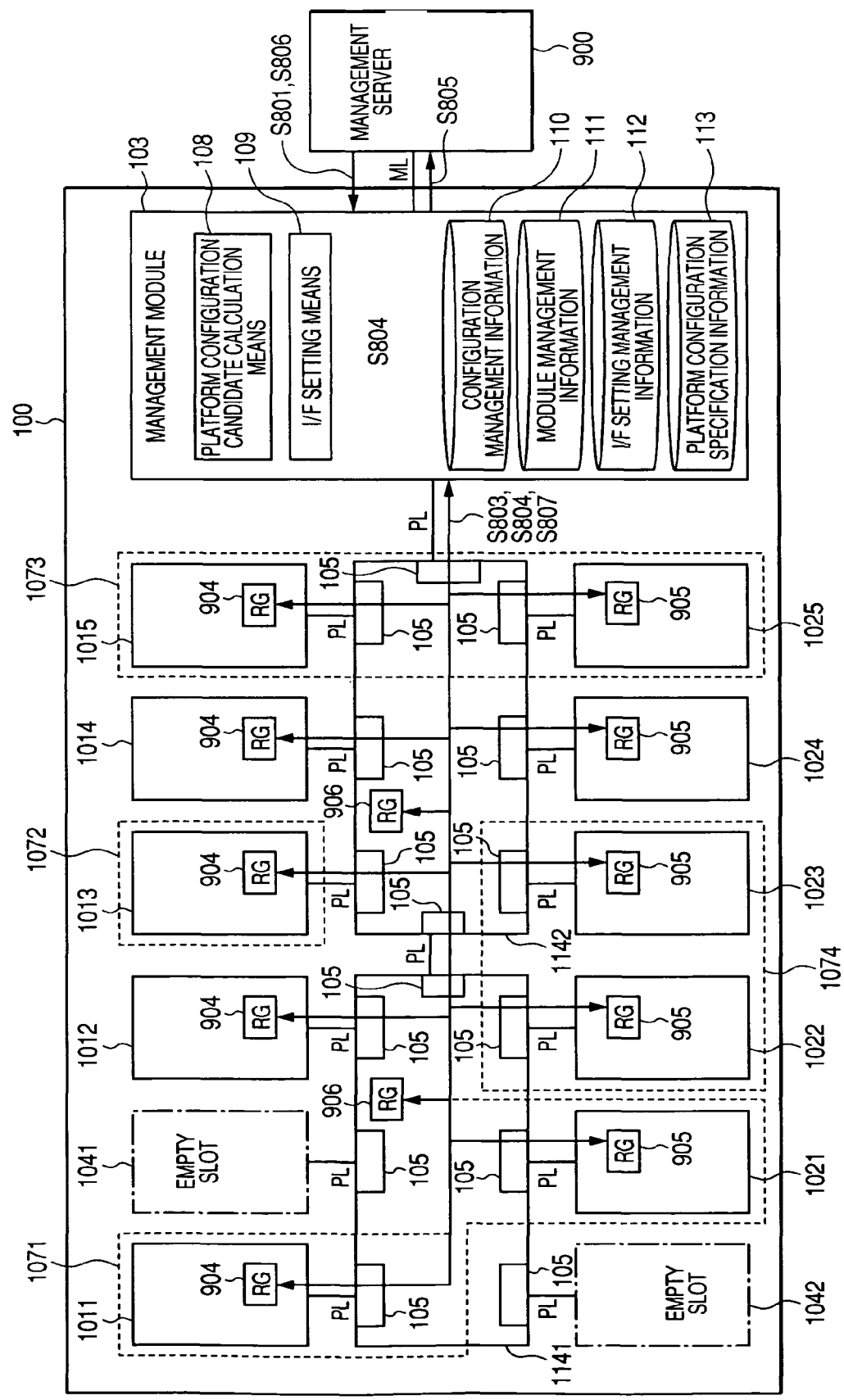
FIG. 9 is a descriptive diagram showing an example of a management method when the information platform of the first embodiment is composed.

FIG. 8 is a flowchart of the management method when composing an information platform in the compound information platform of FIG. 1, and FIG. 9 is a descriptive diagram showing an example of the management method when composing the information platforms in the compound information platform of FIG. 1. The arrows S801-S807 of the information path in FIG. 9 correspond to Steps S801-S807 in the flow chart of FIG. 8.

The management method when composing an information platform is as follows. The management module 103 receives a request to compose a new information platform, or modify an existing information platform, from the management server 900 which manages the platform configuration of the whole system shown in FIG. 9. Communication is performed from the management server 900 to the management module 103 using a management interface ML, such as a management LAN (Step S801). In order to determine whether the proposed configuration of the information platform is feasible, the management module 103 collects information about the universal processing modules 101 and the dedicated processing modules 102 installed in the compound information platform, and the empty slots 104, from a register 904 of the universal processing modules 101, register 905 of the dedicated processing modules 102, and register 906 of the IO switches 114, and updates the configuration management information 110 and the module management information 111 maintained by the management module 103 (Step S802). Also, the management module 103 collects information about the IO protocol interface formed in the compound information platform 100, from the register 904 of the universal processing modules 101, register 905 of the dedicated processing modules 102 and register 906 of the IO switches 114, and updates the interface setting management information 112 maintained by the management module 103 (Step S803). The management module 103, based on the configuration management information 110, module management information 111, interface setting management information 112 and platform configuration specification information 113, performs an information platform configuration candidate calculation which calculates combination candidates for the universal processing modules 101 and the dedicated processing modules 102 which can compose the information platform requested by the management server (Step S804). This information platform configuration candidate calculation will be described in detail later. The management module 103 notifies the information platform configuration candidates calculated in the Step S804 to the management server 900 using the management interface ML (Step S805). The management server 900 selects one of the received information platform configuration candidates, and requests the information platform configuration from the management module 103 using the management interface ML (Step S806). The management module 103, according to the selected information platform configuration candidate, performs the setting of the configuration and the IO protocol interface in the register 904 of the universal processing modules 101, register 905 of the dedicated processing modules 102 and register 906 of the IO switches 114 using the management interface in the platform. Also, since the configuration of the compound information platform 100 was modified, the configuration management information 110, module management information 111 and interface setting management information 112 are updated (Step S807). In this way, the information platform requested by the management server 900 can be composed. In this embodiment of the invention, acquisition of information regarding the universal processing modules 101, dedicated processing modules 102 and empty slots 104, information acquisition and settings regarding the IO protocol interface, and configuration settings of the information platform, are performed using the register 904 of the universal processing modules 101, register 905 of the dedicated processing modules 102 and register 906 of the IO switches 114, but it is sufficient to perform equivalent functions. For example, this may be done also using the command-line interface by telnet access to the universal processing modules 101, dedicated processing modules 102 and IO switches 114.

Figure 11:
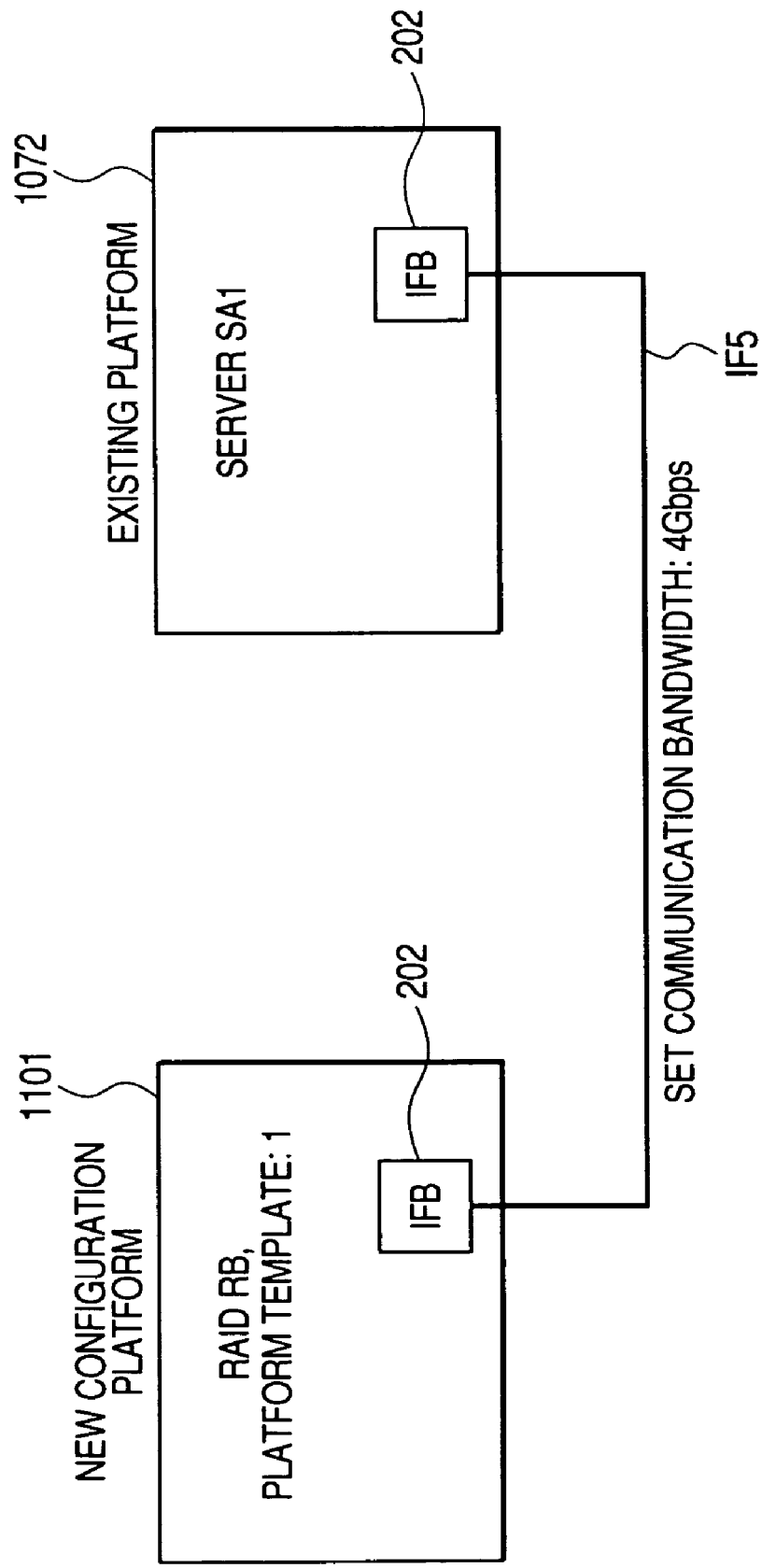
FIG. 11 is a diagram showing an example of a platform configuration according to the information platform configuration request from the management server to the management module of the first embodiment.

Next, the management method for composing the information platform will be described using an actual example by referring to FIG. 2, FIG. 8, FIG. 10, and FIG. 11. FIG. 10 is a diagram showing a typical information platform configuration request made by the management server to the management module in the compound information platform of FIG. 1. FIG. 11 is a diagram showing a typical platform configuration in the information platform configuration request made by the management server to the management module in the compound information platform of FIG. 1.

In this embodiment, the case where a RAID device RB of plural module type is newly formed as an information platform, will be described. In the Step S801 of FIG. 8, the management server 900 makes a new request for the RAID device RB of plural module type to the management module 103. The request to the management module 103 from the management server 900 uses, for example, the configuration request information FT10 of the information platform shown in FIG. 10. Expressing this in tabular form, the configuration request FT10 regarding the information platform comprises a configuration request information item K1001 regarding the information platform, and contents data K1002 of the configuration request information regarding the information platform. The configuration request information item K1001 includes for example a configuration change type E1001 which specifies whether this a new configuration of the information platform, or a modification of an existing information platform, a type E1002 of the information platform to be composed, a template number E1003 of the platform configuration specification defined for each type of information platform currently maintained in the platform configuration specification information 113 shown in FIG. 1, present/absent information E1004 regarding additional processing modules 101, 102 showing whether or not there are any additional processing modules 101, 102 to be installed in the compound information platform 100, present/absent information E1005 of deletion modules 101, 102 showing whether or not there are any processing modules 101, 102 installed in the compound information platform 100 which are to be deleted, present/absent information E1006 regarding inter-device interfaces between existing information platforms in the compound information platform 100, and inter-device interface setting information E1007. The inter-device interface setting information E1007 has an identifier of information platforms which are communications partners, the protocol type of IO protocol interface, and information regarding the maximum guaranteed communication bandwidth set for the IO protocol interface. A descriptive diagram of the platform composed by the information platform configuration request FT10 of FIG. 10, is shown in FIG. 11. As shown in FIG. 11, the type E1002 of the information platform 1101 which is to be newly installed, is the RAID device RB of plural module type, and the template number E1003 of the platform configuration specification is 1. Both the present/absent information E1004 regarding the additional processing modules 101, 102 and the present/absent information E1005 regarding the deletion modules 101, 102, are "absent". The present/absent information E1006 regarding inter-device interfaces is "present", the existing information platform 1072 (server SA1) and IO protocol interface IF5 are connected by the protocol type IFB, and the set maximum guaranteed communication bandwidth is 4 Gbps. When the management module 103 receives an information platform configuration request from the management server, in order to ensure that the configuration management information 110, module management information 111 and interface setting management information 112 are the latest information, information is collected and updated in Step S802, Step S803 of FIG. 8. Next, the management module 103 performs an information platform configuration candidate calculation which calculates combination candidates for the processing modules 101, 102 which can compose the information platform requested by the management server in the Step S804.

Figure 12:
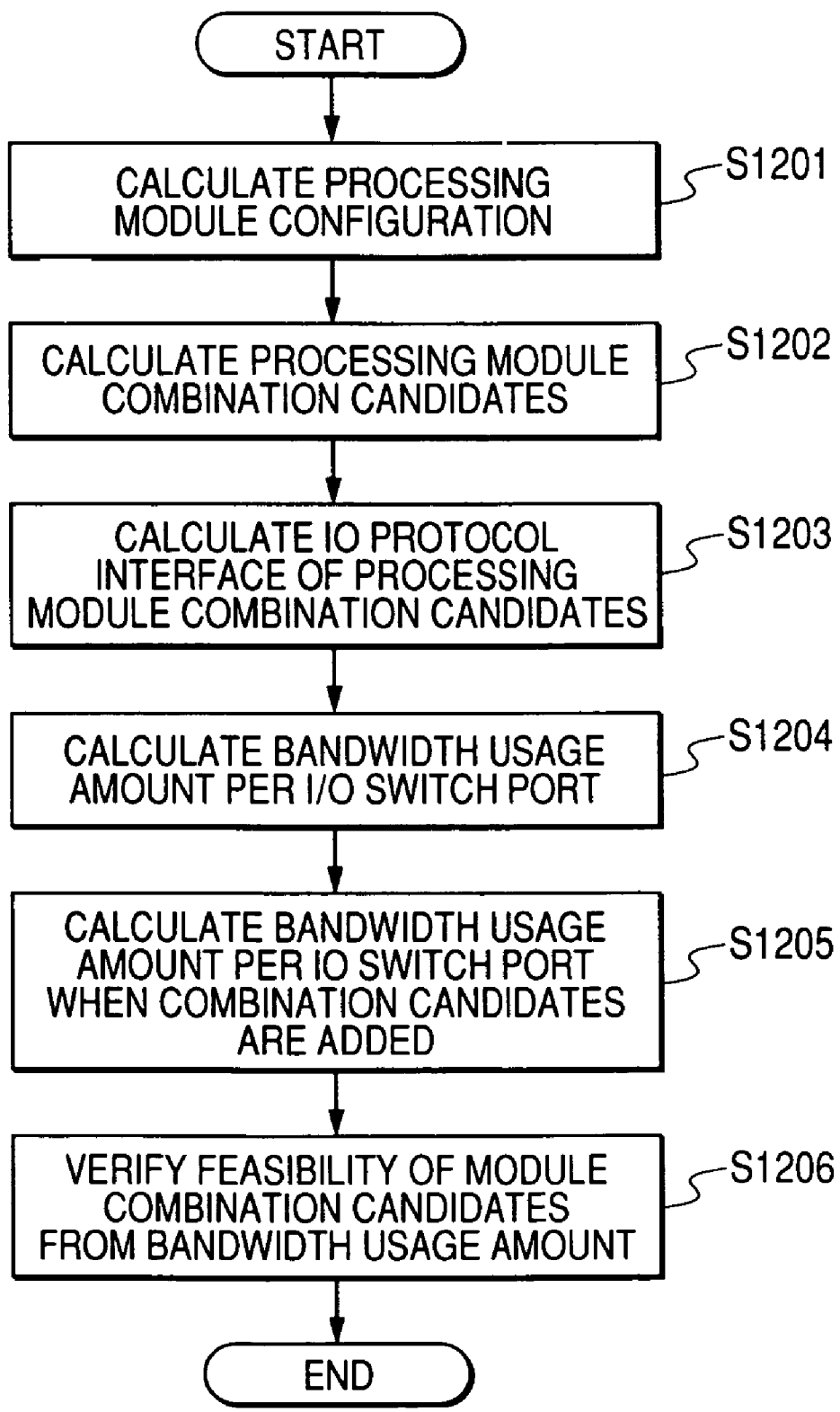
FIG. 12 is a flow chart showing the method of calculating information platform configuration candidates according to the first embodiment.

Hereafter, the method of performing the information platform configuration candidate calculation of the first embodiment will be described in detail using FIGS. 12-19. FIG. 12 is a flow chart of the information platform configuration candidate calculation method of the first embodiment 1. FIG. 13 is a descriptive diagram showing an example of the platform configuration specification information 113. FIG. 14 is a descriptive diagram showing a typical modular configuration of the platform according to the information platform configuration request made by the management server of the first embodiment to the management module. FIG. 15 is a descriptive diagram showing typical information platform module combination configuration candidates used with the information platform configuration candidate calculation method of the first embodiment. FIG. 16 is a descriptive diagram showing a typical configuration of the IO protocol interface of the information platform module combination candidates used in the information platform configuration candidate calculation method of the first embodiment. FIG. 17 is a descriptive diagram showing a typical setting of the physical interconnection used in the information platform configuration candidate calculation method of the first embodiment in FIG. 1. FIG. 18 is a descriptive diagram showing a typical setting of the physical interconnection when information platform module combination candidates used in the information platform configuration candidate calculation method of the first embodiment, are added. FIG. 19 is a descriptive diagram showing an example of first information regarding information platform configuration candidates notified by the management module of the first embodiment to the management server.

The details of the information platform configuration candidate calculation performed by the management module 103 as per FIG. 12, will now be described. In a Step S1201, the management module 103 calculates a module configuration required to compose the information platform requested by the management server in the Step S804. For this calculation, the request information FT10 regarding the information platform shown in FIG. 10 and the platform configuration specification information 113 shown in FIG. 1, are used. For example, the case where the type of information platform is the platform configuration specification information 113 for the RAID device RB of plural module type, is shown in FIG. 13. Expressing this in tabular form, as shown by Table FT13 in FIG. 13, it comprises a platform template number K1301, platform configuration specification item K1302, and contents data K1303 of the platform configuration specification. For each template, as a typical module configuration for the RAID device RB of plural module type, it comprises the type and number of the processing modules 101, 102, the number of IO protocol interfaces between the processing modules 101, 102 in the information platform, the connection processing modules 101, 102 of the IO protocol interface between the processing modules 101, 102 in the information platform, the protocol type, and the maximum guaranteed communication bandwidth set. Since, from the configuration request information FT10 for the information platform shown in FIG. 10, the template number E1003 of the requested platform configuration specification is 1, the module configuration required to compose the information platform is as shown in FIG. 14. Specifically, the information platform 1101 which is to be newly assembled comprises a universal processing module 1401 assigned as a RAID controller RB-C, and a dedicated processing module 1402 assigned as a RAID disk RB-D. For communication in the information platform, the universal processing module 1401 and the dedicated processing module 1402 are connected by the protocol type IFA of the IO protocol interface IF6, and the maximum guaranteed communication bandwidth set is 4 Gbps. Further, for communication with the existing information platform 1072 (server SA1), the universal processing module 1013 and the universal processing module 1401 which form part of the information platform 1072, are connected by the protocol type IFB of the IO protocol interface IF5, and the maximum guaranteed communication bandwidth set is 4 Gbps. By this method, the configuration of processing modules 101, 102 required to form the requested information platform can be derived.

Next, in a step S1202, the processing module combination candidates required to compose the information platform when the information platform is composed from the processing modules installed in the compound information platform 100, are calculated (Step S1202). For this calculation, processing module configuration information and the module management information 111 (Table FT3 of FIG. 3) required to compose the information platform deduced in the Step S1201, are used. Based on the processing module combinations from the processing module configuration information required to compose the information platform deduced in the Step S1201, possible module combinations which can be used using unassigned processing modules of the module management information 111, are calculated. A processing module combination candidate information FT15 found by the result of this calculation is shown in FIG. 15. Expressing this in tabular form, the combination candidate information FT15 for the processing modules 101, 102 comprises a module combination candidate number K1501, an information K1502 regarding the processing modules 101, 102 which are component elements, and an identifier K1503 of the processing modules assigned to the processing modules 101, 102 which are component elements. In this example, two module combination candidates are shown. The first module combination candidate is a module combination candidate which specifies the universal processing module 1012 (identifier G2) shown in FIG. 2 as a processing module for the RAID controller (RB-C), and specifies the dedicated processing module 1024 (identifier E4) shown in FIG. 2 as a processing module for a RAID disk (RB-D). The second module combination candidate is a module combination candidate which specifies the universal processing module 1014 (identifier G4) shown in FIG. 2 as a processing module for the RAID controller (RB-C), and specifies the dedicated processing module 1024 (identifier E4) shown in FIG. 2 as a processing module for the RAID disk (RB-D).

Next, in a step S1203, the IO protocol interface required to compose the information platform is calculated for the module combination candidates requested in the preceding step S1202. For this calculation, the processing module configuration information required to compose the information platform deduced in the Step S1201, the information F15 for the module combination candidates deduced in the Step S1202, and the configuration management information 110 (Table FT5 of FIG. 5), are used. IO protocol interface setting information is calculated for the IO protocol interfaces (including both the interfaces in the device and between devices) required to compose the information platform from the processing module configuration information required to compose the information platform deduced in the step S1201, and for each module combination candidate deduced also in the Step S1202. In this calculation, specification of the physical interconnection PL used by the IO protocol interface is also performed using the configuration management information 110 (Table FT5 of FIG. 5). A setting information FT16 for the IO protocol interface with respect to the module combination candidates found as a result of this calculation is shown in FIG. 16. Expressed in tabular form, the setting information FT16 for the IO protocol interface with respect to the module combination candidates, comprises a number K1601 of the module combination candidate, identifier K1602 of the IO protocol interface, protocol type K1603 of the IO protocol interface, an information K1604 regarding the physical interconnection PL used by the IO protocol interface, and the maximum guaranteed communication bandwidth K1605 set for each physical interconnection. As described above, in this example, there are two module combination candidates. For combination candidate number 1, as the IO protocol interface I5, the protocol type is IFB, and the physical interconnections used are PL3, PL7, PL8 (this corresponds to IF51 of FIG. 2). The maximum guaranteed communication bandwidth set for the physical interconnection is 4 Gbps for PL3, PL7 and PL8. Also, as the IO protocol interface IF6, the protocol type is IFA and the physical interconnections used are PL3, PL7, and PL12 (this corresponds to IF61 of FIG. 2). The maximum guaranteed communication bandwidth set for the physical interconnections is 4 Gbps for PL3, PL7 and PL12. For the other combination number 2, as the IO protocol interface I5, the protocol type is IFB, and the physical interconnections used are PL9, PL8 (this corresponds to IF52 of FIG. 2). The maximum guaranteed communication bandwidth set for the physical interconnections is 4 Gbps for both PL9 and PL8. Also, as the IO protocol interface IF6, the protocol type is IFA and the physical interconnections used are PL9, PL12 (this corresponds to IF62 of FIG. 2). The maximum guaranteed communication bandwidth set for the physical interconnections is 4 Gbps for both PL9 and PL12.

Next, in a step S1204, the communication bandwidth for each physical interconnection PL is calculated for the IO protocol interface set for the current compound information platform 100 overall. This calculation may be performed by summing for each physical interconnection PL using the interface setting management information FT6 of FIG. 6. An information FT17 for the communication bandwidth for each current physical interconnection PL found as a result of this calculation is shown in FIG. 17. Expressing this in tabular form, the communication bandwidth information FT17 for each current physical interconnection PL comprises an identifier K1701 of the physical interconnection PL, a sum total K1702 of the maximum guaranteed communication bandwidth set for each IO protocol interface, a sum total K1703 of the used communication bandwidth for each IO protocol interface, and a maximum permitted communication bandwidth K1704 permitted by the specification of the physical interconnection PL. For example, for the physical interconnection PL1, as shown by the interface setting management information FT6 of FIG. 6, the set maximum guaranteed communication bandwidth is best effort for the IO protocol interface IF1, and 2 Gbps for the IO protocol interface IF2, therefore the sum total K1702 of the maximum guaranteed communication bandwidth is 2 Gbps. Also, the communication bandwidth currently used is 1 Gbps for the IO protocol interface IF1, and 1.5 Gbps for the IO protocol interface IF2, therefore the sum total K1703 of the used communication bandwidth is 2.5 Gbps. Further, the maximum guaranteed communication bandwidth likewise set for the physical interconnection PL7 is 4 Gbps for the IO protocol interface IF2, and 2 Gbps for the IO protocol interface IF3, therefore the sum total K1702 of the maximum guaranteed communication bandwidth is 6 Gbps. Also, the communication bandwidth currently used is 2 Gbps for the IO protocol interface IF2, and 2 Gbps for the IO protocol interface IF2, therefore the sum total K1703 of the used communication bandwidth is 4 Gbps.

Next, in a Step S1205, the communication bandwidth for each physical interconnection PL when the IO protocol interface setting found in the step 1203 is added for each module combination candidate found in the step S1202, is calculated. This calculation may be performed by summing each IO protocol interface setting information FT16 for the module combination candidates shown in FIG. 16 found in the step S1203, to the communication bandwidth information FT17 for each current physical interconnection PL shown in FIG. 17 found in the step S1204. An information FT18 for the communication bandwidth for each physical interconnection PL found for each module combination candidate as a result of this calculation, is shown in FIG. 18. Expressing this in tabular form, the communication bandwidth information FT18 for each physical interconnection PL found for each module combination candidate, comprises a module combination candidate number K1801, an identifier K1802 of the physical interconnection PL, a sum total K1803 of the maximum guaranteed communication bandwidth set for each IO protocol interface in the current configuration, a sum total K1804 of the used communication bandwidth for each IO protocol interface in the current configuration, a maximum permitted communication bandwidth K1805 permitted by the specification of the physical interconnection PL, and a maximum permitted communication bandwidth K1806 after modification of the configuration. As shown in FIG. 18, in the case of, for example, module combination candidate number 1, as shown by the setting information FT16 of the IO protocol interface for the module combination candidates of FIG. 16, there is no addition setting for the physical interconnection identifier PL1, so the sum total K1806 of the maximum guaranteed communication bandwidth after the configuration modification of FIG. 18 does not increase. Also, since the addition due to the IO protocol interfaces IF5, IF6 for the physical interconnection identifier PL7 is 8 Gbps, the sum total K1806 of the maximum guaranteed communication bandwidth after the configuration modification of FIG. 18 is 14 Gbps. Likewise, in module combination candidate number 2, as shown by the setting information FT16 of the IO protocol interface for the module combination candidates of FIG. 16, there is no addition setting for both the physical interconnection identifiers PL1, PL7, so the sum total K1806 of the maximum guaranteed communication bandwidth after the configuration modification of FIG. 18 does not increase.

Next, in a step S1206, based on the communication bandwidth information FT18 of the physical interconnection PL for each module combination candidate found in the step S1205, it is checked whether or not the sum total K1806 of the maximum guaranteed communication bandwidth set after modification of the configuration exceeds the maximum permitted communication bandwidth K1805 permitted by the specification of the physical interconnection PL, and it is determined whether or not the module combination candidates are feasible. In the example of FIG. 18, in the case of module combination candidate number 1, the sum total K1806 of the maximum guaranteed signal bandwidth after the configuration modification of the physical interconnection PL7 exceeds the maximum permitted communication bandwidth K1805 permitted by the specification of PL7, so it is seen that this configuration is not feasible. On the other hand, in the case of module combination candidate number 2, the maximum permitted communication bandwidth K1805 is not exceeded for both the physical interconnections PL1 and PL7. If it is found that the maximum guaranteed signal bandwidth after configuration modification does not exceed the specification maximum permitted communication bandwidth of the physical interconnections for all the physical interconnections PL, it is determined that the module combination candidate concerned is a combination candidate which can be used. In practice, if a simple addition to the information platform described here is performed, it is sufficient to check whether the maximum permitted communication bandwidth of the aforesaid step S1206 is exceeded for those physical interconnections for which communication bandwidth was added due to the additions, i.e., for the physical interconnections shown by K1605 in FIG. 16 (for other physical interconnections, since the communication bandwidth does not change even if module combination candidates are used, the sum total of the maximum guaranteed communication bandwidth does not exceed the maximum permitted communication bandwidth of the interconnections). In this way, combination candidates which can be used are selected from among plural module combination candidates. The above is the information platform configuration candidate calculation method performed in the step S804 of FIG. 8.

Next, in the step S805, the management module 103 notifies the result of the information platform configuration candidate calculation to the management server 900. An information FT19 regarding information platform configuration candidates notified to the management server 103 is shown in FIG. 19. This information is a selection of the module combination candidates FT15 which do not exceed the maximum permitted communication bandwidth of the physical interconnection PL. Expressing this in tabular form, as shown in FIG. 19, information platform configuration candidate information notified to the management server comprise a number K1901 of the module combination candidate, an information K1902 about the processing modules 101, 102 of component elements, and a processing module identifier K1903 assigned to the processing modules of component elements. Here, in order to simplify the description, since a simple configuration is being described, there is only one combination candidate, but there are generally plural module combination candidates. Next, in a step S806, the management server 900 selects one from among the combination candidates, and commands the management module 103 to actually use it. In response to this command, the management module 103 performs the setting of the register 904 of the universal processing module 1014, register 905 of the dedicated processing module 1024 and register 906 of the IO switch 1142 shown in FIG. 9, and the information platform is thereby composed (Step S807). The above is a specific example of the management method for composing the information platform of the first embodiment.

Second Embodiment

Next, the method of the managing the compound information platform according to a second embodiment of the invention will be described using FIG. 20 and FIG. 21, referring specifically to a second information platform configuration candidate calculation. The system configuration of the whole compound information platform of the second embodiment is no different from that of the first embodiment which was described referring to FIG. 1, and the information managed by the management module is also basically the same. FIG. 20 is a flow chart of the information platform configuration candidate calculation method performed in the second embodiment, and replaces the flow chart of FIG. 12. FIG. 21 is a descriptive diagram showing typical information about the information platform configuration candidates notified to the management server from the management module of the second embodiment.

In the information platform configuration candidate calculation flowchart of FIG. 20, a step (Step S2007) which attaches priority to combination candidates of the processing modules 101, 102 is further added to the Steps S1201-Step S1206 of the flowchart of the information platform configuration candidate calculation shown in FIG. 12. Specifically, in the Step S2007, a priority is assigned to the processing module combination candidates deduced in the flowchart up to Step S1206, for example, the larger the difference between the sum total K1806 of the maximum guaranteed communication bandwidths after the configuration change of FIG. 18, and the maximum permitted communication bandwidth K1805 permitted by the specification of the physical interconnection PL. Hence, the compound information platform 100 can be composed in a state where there is the greatest availability in communication bandwidth of the physical interconnection PL. In this example, although the priority was assigned the larger the difference of the maximum permitted communication bandwidth K1805, a priority may also be assigned based on other information. Information which assigns a priority may be for example information about the latency of the IO protocol interface, information about the existence of a single point defect, or priority information related to the use of the processing modules 101, 102, i.e., policy information, from the management server 900. The information platform configuration candidate to which priority was assigned by the information platform configuration candidate calculation flowchart of FIG. 20 is notified to the management server 900 as an information platform configuration candidate information FT21 shown in FIG. 21 by the Step 805 of FIG. 8. Expressing this in tabular form, as shown in FIG. 21, the information FT21 of the information platform configuration candidate notified to the management server comprises the number K1901 of a module combination candidate, the information K1902 about the processing modules 101, 102 of component elements, the processing module identifier K1903 assigned to the processing modules of component elements, and an information K2104 about the priority sequence. Hence, in the second embodiment, the management server 900 can select information platform configuration candidates based on the priority information.

In addition, it is also possible to provide the management module with both the platform configuration candidate calculation flowchart described in FIG. 20 and the platform configuration candidate calculation flowchart of the first embodiment, and to permit selection by either of these calculation flowcharts.

Third Embodiment

A third embodiment which is a further modification of the information platform configuration candidate calculation method, will now be described using FIG. 22-FIG. 24.

Figure 22:
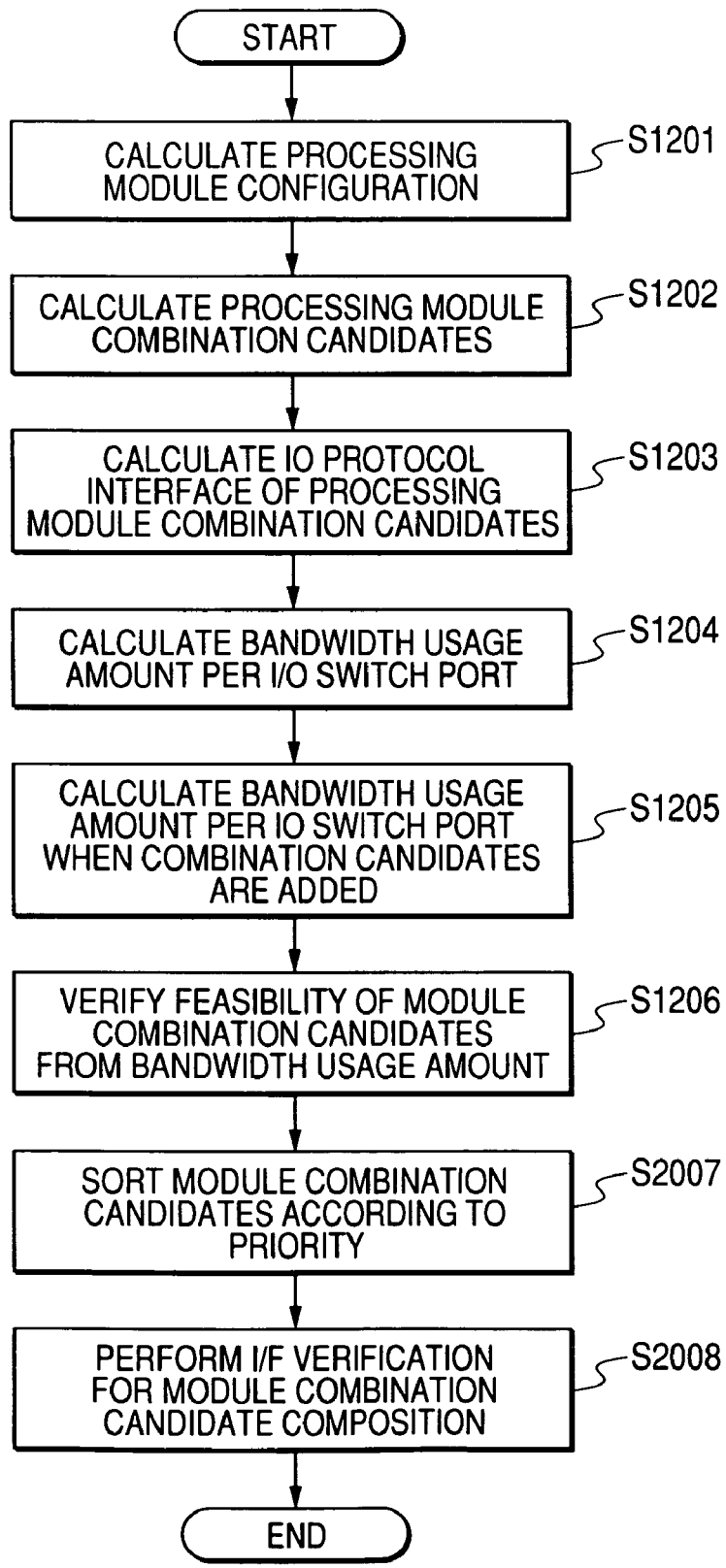
FIG. 22 is a flow chart showing an information platform configuration candidate calculation method according to a third embodiment of the invention.

FIG. 22 is a flow chart of the information platform configuration candidate calculation method of the third embodiment. The flowchart of the information platform configuration candidate calculation of FIG. 22, has a further step (Step S2208) which verifies the IO protocol interface formed for each combination candidate of the processing modules 101, 102 added to the Step S1201-Step S2007 of the flowchart of the information platform configuration candidate calculation shown in FIG. 20.

In the Step S2208, it is verified whether or not, for example, a test communication at the maximum guaranteed communication bandwidth set for the IO protocol interface can be performed correctly. The verification may be performed by another method provided that it is related to the IO protocol interface.

Figure 23:
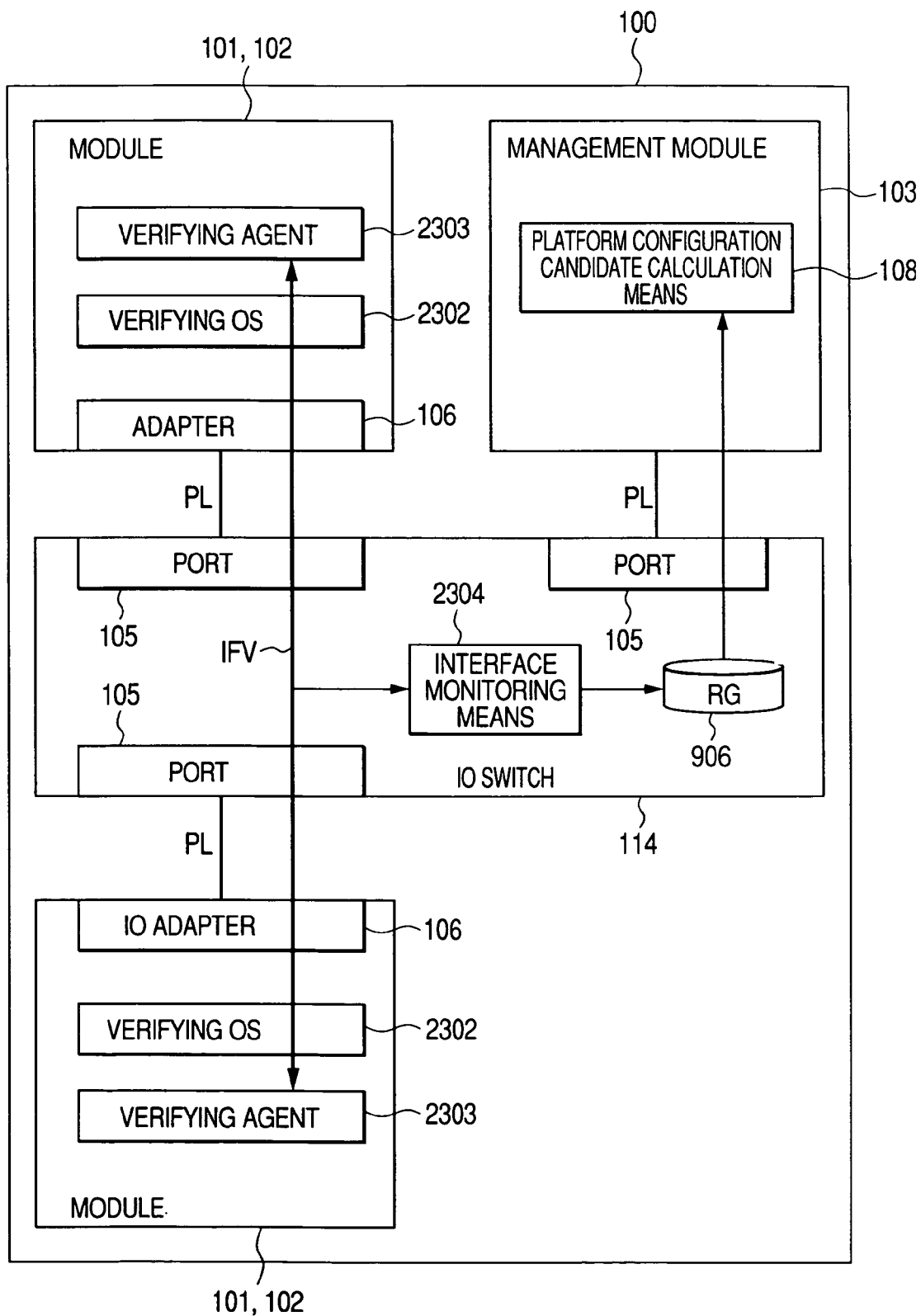
FIG. 23 is a diagram of an IO protocol interface verification method according to the third embodiment.

A descriptive diagram of the method of verifying the IO protocol interface is shown in FIG. 23. An operating system 2302 (OS) for verifying the IO protocol interface and an agent software 2303 for verifying the IO protocol interface, are installed in the processing modules 101, 102. The agent 2303 for performing verification between target IO protocol interfaces IFV performs communication of test data between agents to verify the IO protocol interface. The IO switch 114 has an interface monitor means 2304. The interface monitor means 2304 monitors the test data which is communicated between agents, and writes the result in the register 906. The management module reads the verification result of the IO protocol interface from the register 906. The information platform configuration candidate for which verification of the IO protocol interface was performed by the information platform configuration candidate calculation flowchart of FIG. 22, is notified to the management server 900 as an information FT24 about the information platform configuration candidate as shown in FIG. 24 by the Step 805 of FIG. 8. Expressing this in tabular form, as shown in FIG. 24, the information FT24 about the information platform configuration candidate notified to the management server comprises the number K1901 of the module combination candidate, the information K1902 about the processing modules of component elements, the processing module identifier K1903 of the processing modules assigned to component elements, the information K2104 about the priority sequence, and a verification result information K2405 about the IO protocol interface.

Hence, in the third embodiment, the management server 900 can select an information platform configuration candidate based on verification information about the IO protocol interface. The configuration candidate calculation flowchart of this embodiment can be provided in the management module together with the basic configuration candidate calculation flowchart of the first embodiment, or the configuration candidate calculation flowchart of the second embodiment, so that any of the configuration candidate algorithms can be selected.

Fourth Embodiment

In the management methods for forming a new configuration of the information platform in the embodiments described so far, the information platform was composed using the processing modules 101, 102 which were already installed. On the other hand, in the fourth embodiment, an information platform is composed by a new configuration including additional processing modules 101, 102.

Figures 24, 25:
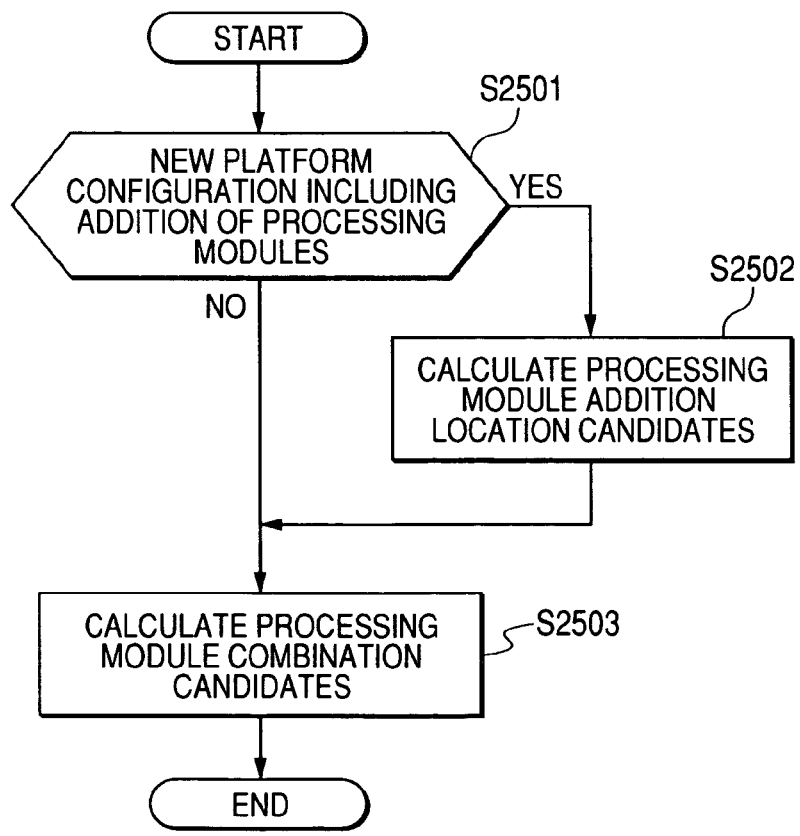
FIG. 24 is a diagram showing an example of information about information platform configuration candidates notified to the management server from the management module of the third embodiment.
FIG. 25 is a flow chart showing an information platform configuration candidate calculation method according to a fourth embodiment of the invention.

FIG. 25 is a flow chart of the information platform configuration candidate calculation method of the fourth embodiment. FIG. 26 is a diagram showing an example of fourth information about information platform configuration candidates notified to the management server from the management module in the compound information platform of FIG. 1.

When a new configuration of the information platform is to be composed including additional processing modules 101, 102, in the configuration request information FT10 about the information platform of FIG. 10 in a request to change the configuration of the information platform from the management server 900 in the Step S801 of FIG. 8, the present/absent information E1004 regarding the additional processing modules 101, 102 is "present", and the type of the additional processing modules 101, 102 is included. Based on this information, the management server 103 performs an information platform configuration candidate calculation in the platform configuration candidate calculation (Step S804) of FIG. 8 by the flowchart shown in FIG. 25. In this flowchart, it is first determined whether to newly compose the information platform including the additional processing modules 101, 102 from the configuration request information FT10 about the information platform of FIG. 10 (Step S2501). When there are no additional processing modules 101, 102, the same processing module 101, 102 candidate calculation as usual which was shown in FIG. 12, is performed (Step S2503). When there are additional processing modules 101, 102 in the Step S2501, a calculation of the candidates (additional locations) for empty slots where the processing modules 101, 102 can be added, is performed (Step 2502). In this case, in the Step S2503 which performs the processing module 101, 102 candidate calculation, the basic calculation method is identical to the usual method shown in FIG. 12, but a calculation which includes information about the installation positions of the additional processing modules, is performed.

The information platform configuration candidates, when there are additional processing modules 101, 102 in the information platform configuration candidate calculation flowchart of FIG. 25, are notified to the management server 900 as an information FT26 about information platform configuration candidates shown in FIG. 26 by the Step 805 of FIG. 8. Expressing this in tabular form, as shown in FIG. 26, the information FT26 about the information platform configuration candidates notified to the management server, comprises the number K1901 of combination configuration candidates, the information K1902 about the processing modules 101, 102 of component elements, the processing module identifier K1903 assigned to the processing modules 101, 102 of component elements, a processing module 101, 102 operation K2604 showing whether or not there is an addition of processing modules 101, 102, an identifier K2605 of the connection IO switch 114 showing the operating locations of the processing modules 101, 102, and a port number K2606 of the connection IO switch 114. Hence, the management server 900 can select information platform configuration candidates containing additional position information about the processing modules 101, 102.

Fifth Embodiment

In the fifth embodiment, as a further extension, a configuration modification of the information platform including deletion and addition of the processing modules 101, 102 is performed.

Figure 27:
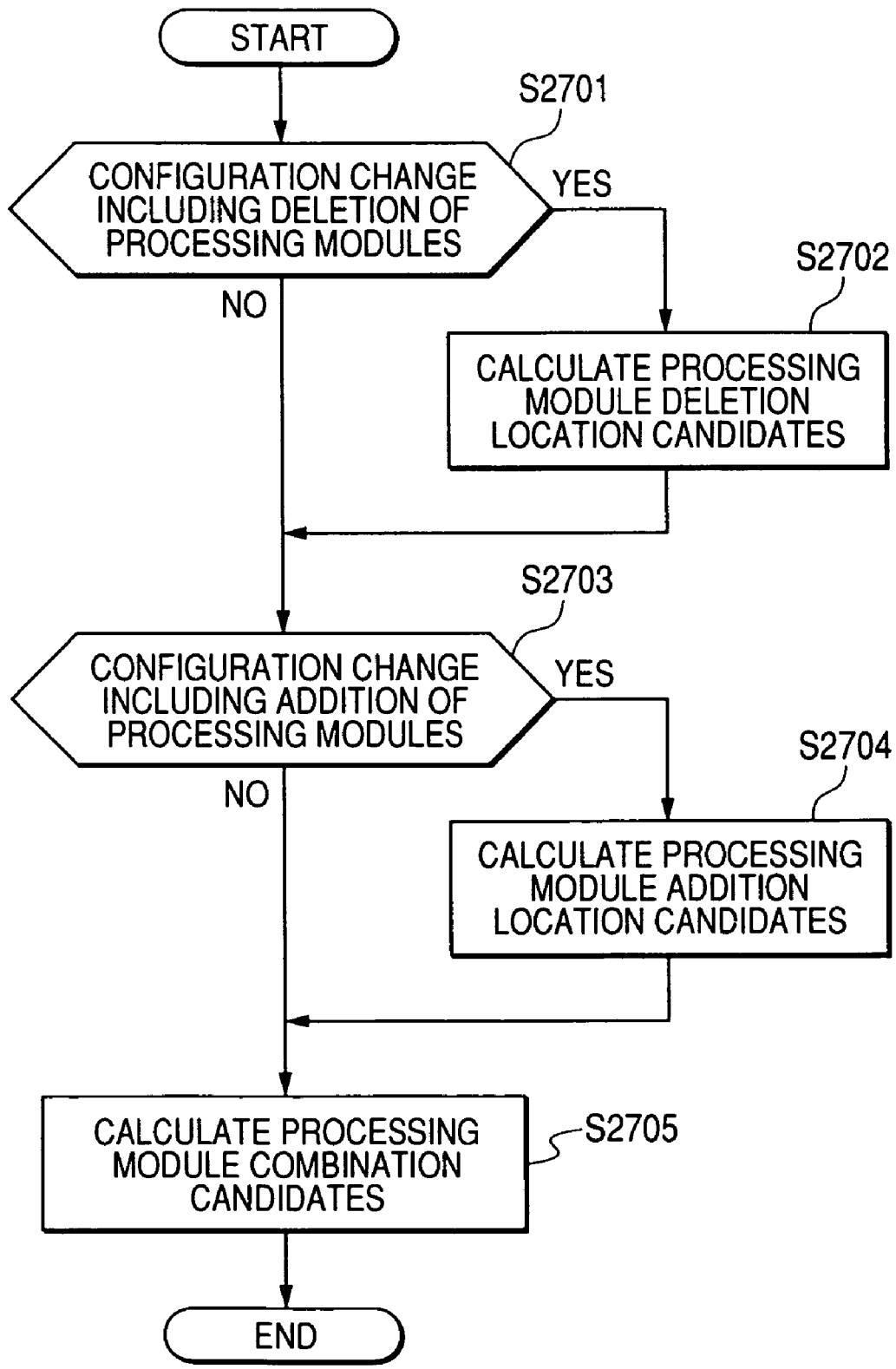
FIG. 27 is a flow chart showing an information platform configuration candidate calculation method according to a fifth embodiment of the invention.

FIG. 27 is a flow chart of the information platform configuration candidate calculation method of the fifth embodiment.

When the configuration of the information platform is to be modified including addition and deletion of the processing modules 101, 102, in the configuration request information FT10 about the information platform of FIG. 10 in a request to change the configuration of the information platform from the management server 900 in the Step S801 of FIG. 8, the configuration change type E1001 is a configuration modification of an existing information platform, the present/absent information E1004 of the additional processing modules 101, 102 is "present" and the type of the additional processing modules 101, 102 is included, the present/absent information E1005 of the deletion modules 101, 102 is "present" and the type of the deletion modules 101, 102 is included.

Based on this information, the management server 103 performs an information platform configuration candidate calculation by the flow chart shown in FIG. 27 in the platform configuration candidate calculation (Step S804) of FIG. 8. In this flow chart, it is determined whether there is a configuration change of the information platform which includes deletion of the processing modules 101, 102 from the configuration request information FT10 about the information platform of FIG.10 (Step S2701). When there are processing modules 101, 102 to be deleted, candidates for empty slots where the processing modules 101, 102 can be deleted, are calculated (Step 2702). Next, it is determined whether there is a configuration change of the information platform which includes addition of the processing modules 101, 102 from the configuration request information FT10 about the information platform of FIG. 10 (Step S2703). When there are processing modules 101, 102 to be added, candidates for empty slots where the processing modules 101, 102 can be added, are calculated (Step 2704). Next, a processing module 101, 102 combination candidate calculation is performed (Step S2705). This calculation method is basically identical to the method of the first embodiment shown in FIG. 12, but it includes information about the installation position of the processing modules 101, 102 to be added, or information about the installation position of the processing modules 101, 102 to be deleted. Information platform configuration candidates when there are additional processing modules 101, 102 or deletion processing modules 101, 102 from the information platform configuration candidate calculation flow chart of FIG. 27, are notified to the management server 900 as an information FT28 about information platform configuration candidates as shown in FIG. 28 by the Step 805 of FIG. 8. Expressing this in tabular form, as shown in FIG. 28, the information FT28 about the information platform configuration candidates notified to the management server comprises the number K1901 of the module combination candidate, the information K1902 about the processing modules of component elements, the processing module identifier K1903 assigned to the processing modules of component elements, the processing module operation K2604 showing whether there is any addition of processing modules or deletion of processing modules, the identifier K2605 of the connection IO switch 114 showing the operating location of the processing modules, and the port number K2606 of the connection IO switch 114. Hence, the management server 900 can select the information platform configuration candidates included the addition locations of the processing modules, and the deletion locations of the processing modules.

Other Modifications

In the block diagram showing in FIG. 1, the case where there is one of the compound information platforms 100 is shown, but this embodiment of the invention can easily be extended to the case where the IO switches of two or more compound information platforms are connected.

The invention has been described in detail based on some aspects of the invention designed by the Inventors, but it should be understand that the invention is not to be construed as being limited in anyway thereby, various modifications being possible within the scope and spirit of the appended claims.

The management method for a compound information platform according to the invention is suitable for simplifying the operational administration of an IT system such as a data center.

What is claimed is:

1. A compound information platform comprising:
a plurality of different types of information platforms, each information platform comprising one or more universal processing modules having a universal processing function and including a processor and a memory; and one or more dedicated processing modules having a dedicated processing function;
a management module which manages said one or more universal processing modules and said one or more dedicated processing modules; and
one or more I/O switches which connect said one or more universal processing modules and said one or more dedicated processing modules together and perform communication data switching,
wherein said one or more universal processing modules and said one or more dedicated processing modules have one or more I/O adapters for communication using said I/O switches,
wherein each information platform of said plurality of different types of information platforms formed by combining said universal processing modules and said dedicated processing modules,
wherein said management module comprises:
configuration management information including information regarding connections between said universal processing modules, said dedicated processing modules, and said I/O switches;
module management information including types of said universal processing modules and said dedicated processing modules which can be composed for each information platforms of said plurality of different types of information platforms, and a type ID of an information platform currently assigned; and
interface setting management information comprising information of physical interconnections between communications interfaces of said universal processing modules and said dedicated processing modules, set by using said I/O adapters and said I/O switches in each information platform of said plurality of different types of information platforms, maximum guaranteed communications bandwidths settings and used communications bandwidths for the physical interconnections,
wherein said I/O switch monitors said used communications bandwidths used by each of said physical interconnections, and notifies the used communications bandwidths monitored to said management module,
wherein when composing a new information platform, said management module computes modules combination candidates selected from said universal processing management modules or said dedicated processing modules for said new information platform, specifies the physical interconnections between modules constituting each module combination candidate, adds the maximum guaranteed communications bandwidths of the physical interconnection specified between the modules constituting said module combinations from said interface setting management information for each of said modules combination candidates, compares added results of said maximum guaranteed communications bandwidths with maximum permitted communications bandwidths for each of said physical interconnections within one of said modules combination candidates, assigns a preference order to modules combination candidates based on a size of an unassigned communications bandwidth for I/O switch ports from a communication bandwidth between said communications interfaces for each physical interconnection computed by said management module, and a suitability of specification conditions of a configuration specification of each information platform of said plurality of different types of information platforms, and decides modules combination candidates which can form part of said compound information platform.

2. The compound information platform according to claim 1, when recomposing an information platform including one or more universal processing modules or dedicated processing modules not yet installed in said compound information platform, said management module computes modules combination candidates for one or more universal processing modules or dedicated processing modules which are candidates for each information platform of said plurality of different types of information platforms, including I/O switch connection points of said one or more universal processing modules or dedicated processing modules which are not yet installed in said compound information platform, and deduces modules combination candidates which can form part of said compound information platform.

3. The compound information platform according to claim 1, wherein said management module removes said one or more universal processing modules or dedicated processing modules forming said compound information platform, and
when recomposing said compound information platform using one or more universal processing modules or dedicated processing modules not yet installed in said compound information platform, or installed in the compound information platform but not yet assigned thereto, wherein said management module computes modules combination candidates comprising said one or more universal processing modules or dedicated processing modules which are candidates for composing each information platform of said plurality of different types of information platforms, including I/O switch connection points of said one or more universal processing modules or dedicated processing modules removed from said information platform, and I/O switch connection points of said one or more universal processing modules or dedicated processing modules not yet installed in said compound information platform, and deduces module combination candidates which can form part of said compound information platform.

4. The compound information platform according to claim 1, wherein said management module removes said one or more universal processing modules or dedicated processing modules forming said compound information platform from said compound information platform, computes modules combination candidates comprising said one or more universal processing modules or dedicated processing modules which are candidates for composing said compound information platform, including I/O switch connection points of said one or more universal processing modules or dedicated processing modules removed from said compound information platform, and deduces module combination candidates which can form part of said compound information platform.

5. The compound information platform according to claim 1,
wherein said management module includes configuration specification information for the information platform relating to module combination specifications for a type of information platform,
wherein said management module determines whether or not the specification conditions of the configuration specification information for each information platform of said plurality of different types of information platforms are suitable, computes modules combination candidates derived from said one or more universal processing modules or dedicated processing modules which are candidates for composing each information platform of said plurality of different types of information platforms, and deduces module combination candidates which can form part of said compound information platform.

6. The compound information platform according to claim 1, wherein said universal processing module and said dedicated processing module verifies communication for the modules combination candidates deduced by said management module by actually sending and receiving test packets along paths of the communications interfaces formed by said compound information platform.

7. A method of managing a compound information platform having, one or more different types of information platform, each information platform comprising one or more universal processing modules having a universal processing function, one or more dedicated processing modules having a dedicated processing function specific to the dedicated processing modules, a management module which manages said one or more universal processing modules and said one or more dedicated processing modules, and one or more I/O switches which connect these modules together and perform communication data switching, wherein said one or more universal processing modules and said one or more dedicated processing modules have one or more I/O adapters for communication using said I/O switches, each information platform of said different types of information platforms being formed by combining said universal processing modules and said dedicated processing modules, said managing method comprising the steps of:
when each information platform of said different types of information platforms is formed using said one or more universal processing modules or dedicated processing modules, performing communication between said I/O switches, said universal processing modules and said dedicated processing modules using a management interface, and generating configuration management information comprising connection relations between said universal processing modules, said dedicated processing modules and said I/O switches;
performing communication between said universal processing modules and said dedicated processing modules using a management interface, and generating module management information comprising a type of information platform which can be composed and an information platform identification which is currently assigned;
performing communication between said I/O switches, said universal processing modules and said dedicated processing modules using a management interface, and generating interface setting management information comprising information of physical interconnections between said universal processing modules and said dedicated processing modules set by using said I/O adapters and said I/O switches in the compound information platform, setting information of maximum communications bandwidths and used communications bandwidths for the physical interconnections;
calculating module combination candidates derived from said plural universal processing modules or said dedicated processing modules which are candidates for each information platform of said different types of information platforms;

specifying the physical interconnections between modules forming modules combination candidates;

adding maximum guaranteed communications bandwidths of communications interfaces between modules of said modules combination candidates for said specified physical interconnections, to total values of the maximum guaranteed communications bandwidths of the communications interfaces for each physical interconnections computed from said interface setting management information;

assigning a preference order to module combination candidates based on a size of an unassigned communications bandwidth for I/O switch ports from said communications bandwidths of the communications interfaces for each physical interconnections calculated by said management module, and a suitability of specification conditions of configuration specification of each information platform of said different types of information platforms; and selecting feasible module combination candidates by comparing said total values of the maximum guaranteed communications bandwidths for each physical interconnections, with a maximum permitted communications bandwidths of each physical interconnections.

8. The method of managing a compound information platform according to claim 7, wherein, when recomposing an information platform including one or more universal processing modules or dedicated processing modules not yet installed in said compound information platform, said management module computes modules combination candidates derived from one or more universal processing modules or dedicated processing modules which are candidates for each information platform of said plurality of different types of information platforms, including I/O switch connection points of said one or more universal processing modules or dedicated processing modules which are not yet installed in said compound information platform, and feasible modules combination candidates are selected from computed modules combination candidates.

9. The method of managing a compound information platform according to claim 7, wherein, when removing said one or more universal processing modules or dedicated processing modules forming said compound information platform, and recomposing said compound information platform using one or more universal processing modules or dedicated processing modules not yet installed in said compound information platform, or installed in the compound information platform but not yet assigned thereto, modules combination candidates comprising said one or more universal processing modules or dedicated processing modules which are candidates for composing each information platform of said plurality of different types of information platforms, including I/O switch connection points of said one or more universal processing modules or dedicated processing modules removed from said compound information platform, and I/O switch connection points of said one or more universal processing modules or dedicated processing modules not yet installed in said compound information platform, and feasible modules combination candidates selected from computed modules combination candidates.

10. The method of managing a compound information platform according to claim 7, wherein when removing one or more universal processing modules or dedicated processing modules composing each information platform of said plurality of different types of information platforms from said compound platform, module combination candidates comprising said one or more universal processing modules or dedicated processing modules which are candidates for composing each information platform of said plurality of different types of information platforms, including I/O switch connection points of said one or more universal processing modules or dedicated processing modules removed from said compound information platform, and feasible module combination candidates selected from computed module combination candidates.

11. The method of managing a compound information platform according to claim 7, wherein said management module includes composition specification information for the information platform relating to module combination specifications for a type of information platform, said management module determines whether or not the composition specification information for each information platform of said plurality of different types of information platforms is suitable, computes modules combination candidates derived from said one or more universal processing modules or dedicated processing modules which are candidates for composing said compound information platform.

12. The method of managing a compound information platform according to claim 7, wherein:

when each information platform of said plurality of different types of information platforms is formed by using said or more universal processing modules or dedicated processing modules, said universal processing module and said dedicated processing module verifies communication for the modules combination candidates deduced by said management module by actually sending and receiving test packets along paths of the communications interfaces formed by said compound information platform.

\* \* \* \* \*